United States Patent [19]

Morishita et al.

[11] Patent Number: 4,794,531
[45] Date of Patent: Dec. 27, 1988

[54] UNSHARP MASKING FOR IMAGE ENHANCEMENT

[75] Inventors: Koichi Morishita, Kawasaki; Shimbu Yamagata, Yokohama; Tetsuo Okabe, Kashiwa; Tetsuo Yokoyama; Kazuhiko Hamatani, both of Tokyo, all of Japan

[73] Assignees: Hitachi, Ltd; Hitachi Medical Corporation, both of Tokyo, Japan

[21] Appl. No.: 41,627

[22] Filed: Apr. 22, 1987

Related U.S. Application Data

[63] Continuation-in-part of Ser. No. 795,461, Nov. 6, 1985, abandoned.

[30] Foreign Application Priority Data

Nov. 7, 1984 [JP] Japan .................................. 59-233212
Nov. 7, 1984 [JP] Japan .................................. 59-233213
Apr. 25, 1986 [JP] Japan .................................. 61-94562

[51] Int. Cl.$^4$ ............................................. G06F 15/68
[52] U.S. Cl. .............................. 364/413.13; 358/111; 382/54
[58] Field of Search ......................... 364/414; 382/54; 378/62; 358/166, 111

[56] References Cited

FOREIGN PATENT DOCUMENTS 0171573 9/1985 Japan .

Primary Examiner—Jerry Smith
Assistant Examiner—Clark A. Jablon
Attorney, Agent, or Firm—Antonelli, Terry & Wands

[57] ABSTRACT

In an unsharp masking processing for sharpening images such as radiographic images, an emphasizing coefficient of an image and parameters for real-time change of picture quality are set interactively. The entire image is divided into a plurality of regional images and filtering optimized for each pixel image is effected using a standard deviation computed for each regional image and a density difference between pixel images.

8 Claims, 29 Drawing Sheets (A) ORIGINAL IMAGE (B) EMPHASIZED IMAGE (A) EDGE PORTION IN ORIGINAL IMAGE (B) AVERAGED IMAGE (C) HIGH FREQUENCY COMPONENT (D) EMPHASIZED ARTIFACT (A)

(B)

(C)

(A)

(B)

| $X_{i-1,j-1}$ | $X_{i,j-1}$ | $X_{i+1,j+1}$ |
|---|---|---|
| $X_{i-1,j}$ | $X_{i,j}$ | $X_{i+1,j}$ |
| $X_{i-1,j+1}$ | $X_{i,j+1}$ | $X_{i+1,j+1}$ |

×

| 1 | 1 | 1 |
|---|---|---|
| 1 | 1 | 1 |
| 1 | 1 | 1 |

ORIGINAL IMAGE
EDGE PORTION

WEIGHTED MEAN IMAGE
SUSTAINING EDGE

HIGE FREQUENCY
COMPONENT

EMPHASIZED IMAGE

UNSHARP MASKING FOR IMAGE ENHANCEMENT

This application is a continuation-in-part of application Ser. No. 795,461, filed Nov. 6, 1985, now abandoned.

BACKGROUND OF THE INVENTION

This invention relates to a method of image emphasizing especially suitable for image processing systems for images such as radiographic images.

A known method of sharpening radiographic images as exemplified in, for example, Japanese patent unexamined publication No. 56-11035 employs an unsharp or unsharped masking processing in which the emphasizing coefficient is determined or changed in accordance with a density value of an original i.e., unprocessed or untreated image (in terms of a pixel image) or a local mean density value of the original image obtained by averaging neighbouring pixels of the original image (also in terms of pixel images).

The known method, however, takes no account of a capability of interactive processing which can interactively change the emphasizing coefficient to permit real-time changes in picture quality.

Consequently, values of parameters for determining picture quality must be set in advance by a doctor or an examiner and besides the processing time extends to amounts up to approximately 90 to 180 seconds, resulting in difficulties in obtaining optimum picture quality for each image. More particularly, an unsharp masking processing employed by the known method is formulated as follows:

$$X'_{ij} = \beta(X_{ij})(X_{ij} - \overline{X}_{ij}) + X_{ij}$$

$$(\overline{X}_{ij} = {}_k\Sigma_l\Sigma X_{i\pm k, j\pm l}/N) \quad (1)$$

where an original image (implicitly representative of its density) is represented by $X_{ij}$, (i,j, represent a column and row of an image in a two-dimensional matrix, respectively) an unsharp image or unsharped image (also implicitly representative of its density) by $\overline{X}_{ij}$, an emphasizing coefficient by $\beta(X_{ij})$, and a processed image by $X'_{ij}$.

In order to determine picture quality according to this processing, (1) a window size (values of k and l which represent a column and row of the window, respectively) necessary for averaging must be set in advance, and (2) a maximum value and a function form of the emphasizing coefficient $\beta(X_{ij})$ must be set in advance. But these parameters may possibly be changed in accordance with the purposes of image viewing and the preference of an image viewer and the capability of interactively setting the parameters is therefore indispensable. In addition, when it is desired to define the emphasizing coefficient in a more sophisticated manner by using two variables, for example, the pre-setting of the parameters becomes more difficult.

Incidentally, when the density value is specified to correspond to an imaging region (such as a bone or a muscle to be radiographically imaged), the aforementioned known method is considered to be effective for such an imaging portion because of its capability to change the degree of emphasizing in accordance with the imaging portion. But, for an instance where there is no fixed correspondence between density value and imaging portion or where the degree of emphasizing is desired to be changed for the same density value, this known method is unsuitable, facing problems that insufficient emphasizing occurs for an imaging portion which is flat and subject to a gradual change in density value of its image and that excessive emphasizing occurs for an imaging portion which corresponds to an edge portion subject to a rapid change in density value of its image. Further, since a simple averaging is the basis for formation of an unsharp image, the known method suffers from generation of an artifact at the edge portion in addition to the excessive emphasis.

SUMMARY OF THE INVENTION

A first object of this invention is provide a method of interactively preforming a real-time processing for an unsharp masking and a picture quality parameter setting processing.

A second object of this invention is to provide a method which can perform efficient image emphasis over all the images.

To accomplish the first object, according to the invention, the contents of processings are all made ascribable to four arithmetic operations between images so as to be simplified for a pipe-line processing.

To accomplish the second object, the entire image is divided into a plurality of regional images and characteristic values are extracted from each regional area of an image to set optimum processing parameters for each regional area of an image.

DESCRIPTION OF THE PREFERRED EMBODIMENTS

Figure 1:
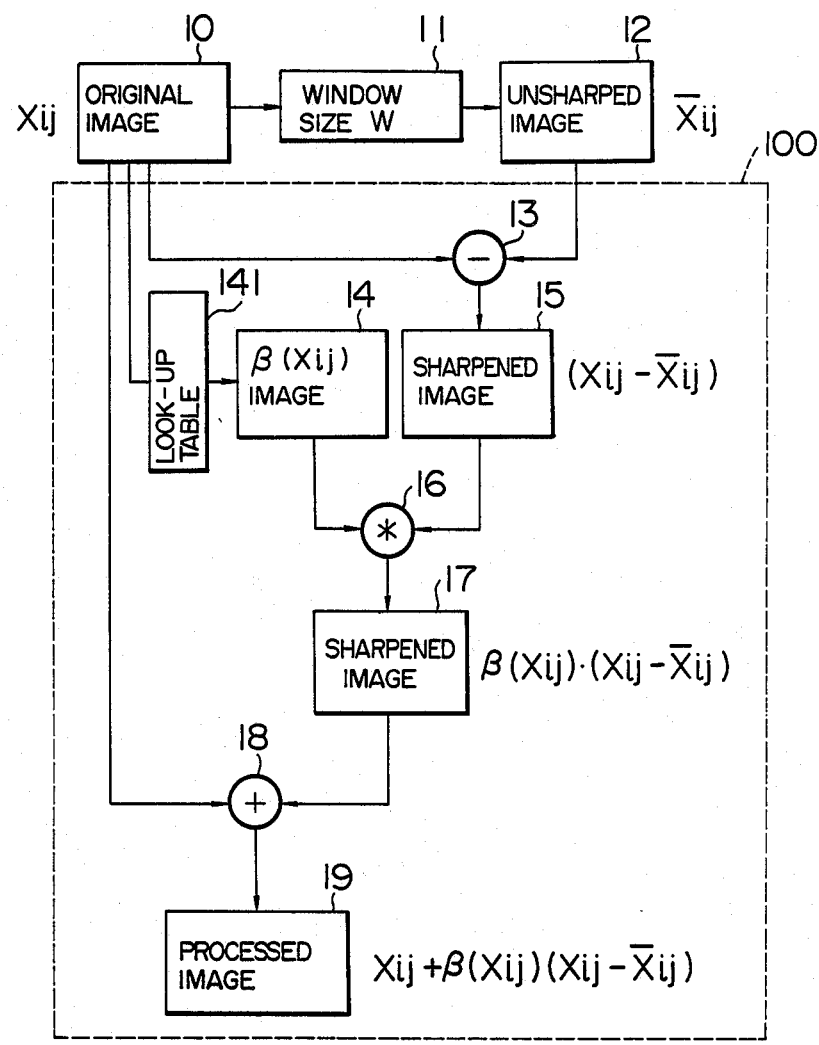
FIG. 1 is a block diagram schematically showing a real-time processing fundamental system.

In a preparatory operation prior to executing a real time operation of equation (1) in regular sequence, for example, as shown in FIG. 1, an original image $X_{ij}$ in a block 10 is averaged in a block 11 by averaging neighbouring pixels of the original image within a regional area with a window size $\overline{W}$ to form an unsharp image $\overline{X}_{ij}$ in block 12. Subsequently, in a real-time processing unit 100 indicated by a dotted-line block, the original image $X_{ij}$ is first processed by a look-up table in block 141 to prepare an image of a parameter $\beta(X_{ij})$ from the original image $X_{ij}$ in block 14. Thereafter, the unsharp image $\overline{X}_{ij}$ is subtracted from the original image $X_{ij}$ at a subtractor 13 to form a sharp image $X_{ij}-\overline{X}_{ij}$ in block 15 which in turn is multiplied with the parameter image $\beta(X_{ij})$ at a multiplier 16 to form a sharp or sharpened image $(X_{ij})\cdot(X_{ij}-\overline{X}_{ij})$ in block 17. Finally, the sharp image is added with the original image at an adder 18 to obtain a processed image $X'_{ij}=X_{ij}+\beta(X_{ij})\cdot(X_{ij}-\overline{X}_{ij})$ in block 19. In this manner, the contents of processings are all made ascribable to four arithmetic operations between images so as to be simplified for a pipe-line processing. To specifically describe the above with numerical values, it is assumed that the entire image consisting of $512\times512$ pixel images is processed with an ordinary image processor having a cycle time of 120 nS. Then, the processing in the unit 100 involves the formation of the parameter image $\beta(X_{ij})$ amounting to $512\times512\times120$ nS$\approx$30 mS and a pipe-line processing covering the blocks 13 to 19 which also amounts to 30 mS, thereby totalling up to about 60 mS which is sufficient for a real-time processing.

Figure 2:
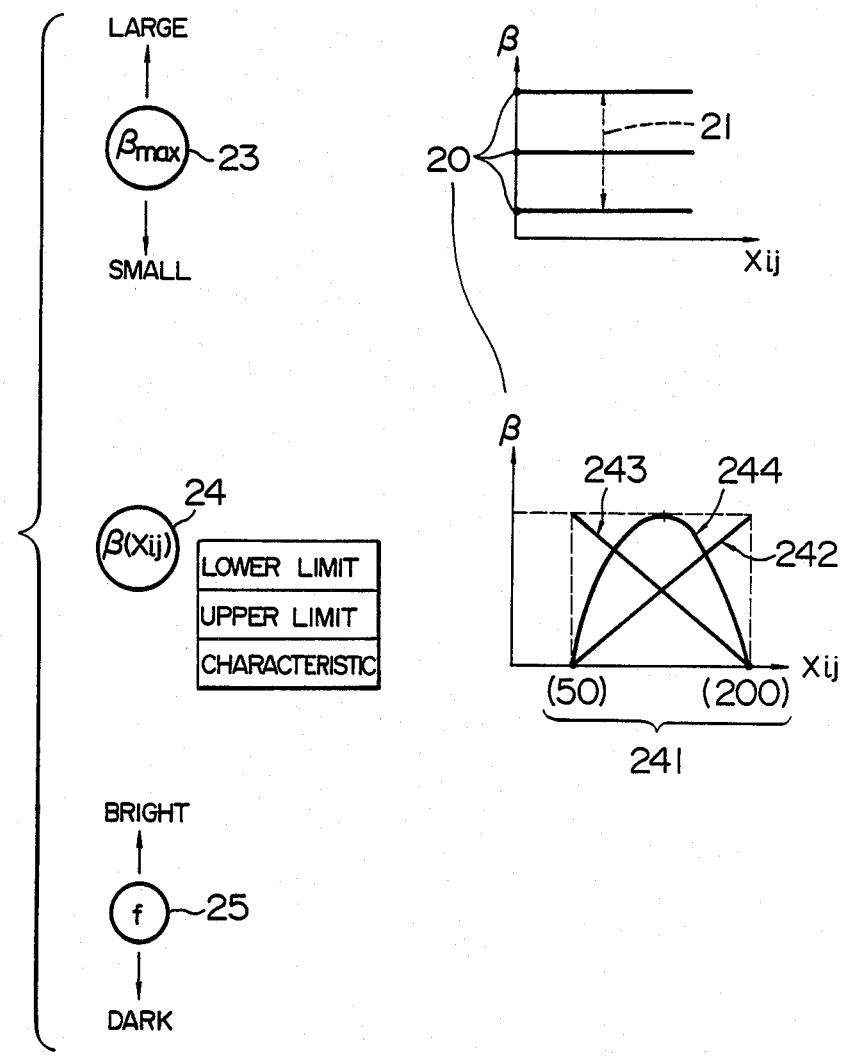
FIG. 2 diagrammatically shows interactive parameter designation fundamental schemes.

Picture quality parameters are set in a manner to be described below with reference to FIG. 2. For clarity of explanation, consider an unsharp masking processing indicated by the following equation:

$$X'_{ij}=\beta(X_{ij})(X_{ij}-\overline{X}_{ij})+X_{ij}+f \quad (2)$$

In this example, three kinds of parameters are designated.

(a) Designation of a parameter representing a maximum value ($\beta$max) of emphasizing coefficient in block 23.

This parameter defines a degree of emphasizing a sharp image and is varied by an input unit such as a track ball within a range designated by dotted line 21 to assume various levels 20.

(b) Designation of a parameter representing an emphasizing coefficient ($\beta(X_{ij})$) in block 24.

This parameter designates a relation between an arbitrary variable (a density value of the original image herein) and image emphasis. Specifically, an emphasizing coefficient $\beta(X_{ij})$ having any desired one of the characteristics as represented by curves 242 to 244 can be realized by designating an effective range 241 (from 50 to 200 herein) of $X_{ij}$ by means of a keyboard and thereafter designating a characteristic curve for $\beta$.

(c) Designation of a parameter representing brightness (f) in block 25.

This parameter designates brightness of the entire image. The previously described real-time processing system in combination with the picture quality parameter setting scheme of this invention so as to obtain desired picture quality interactively and immediately.

It should be understood that the unsharp masking processing pursuant to equation (2) used herein only for simplicity of explanation may obviously be replaced by other unsharp masking processings pursuant to $$X'_{ij}=[\beta(X_{ij})+H(\sigma_{ij})](X_{ij}-\overline{X}_{ij})+X_{ij}+f$$

$$X''_{ij}=[\beta(X_{ij})\cdot H(\sigma_{ij})](X_{ij}-\overline{X}_{ij})+X_{ij}+f$$

where $\sigma_{ij}$ is a density statistic within a local region or window.

The parameters eventually obtained from the above interative processing are stored together with images in an external storage to store parameters optimized for each image which may be used as default values upon later retrieval.

Referring now to FIGS. 3 to 8, one embodiment of the invention will be described.

Figure 3:
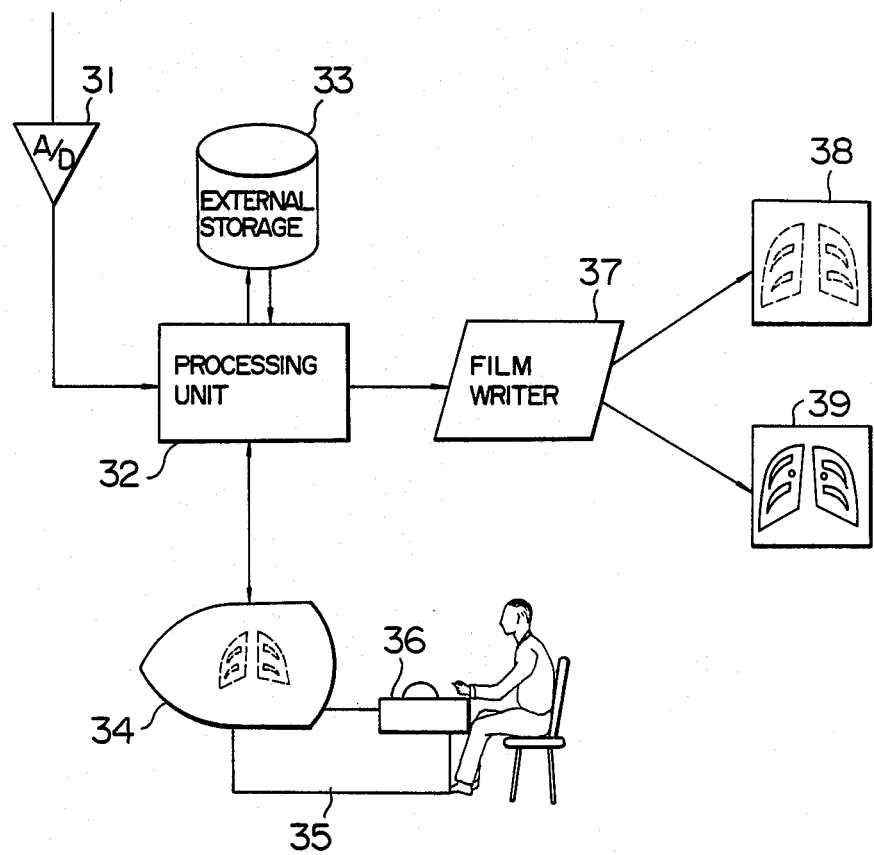
FIGS. 3 and 4 are block diagrams showing embodiments of an image processing system according to the invention.
Figure 4:
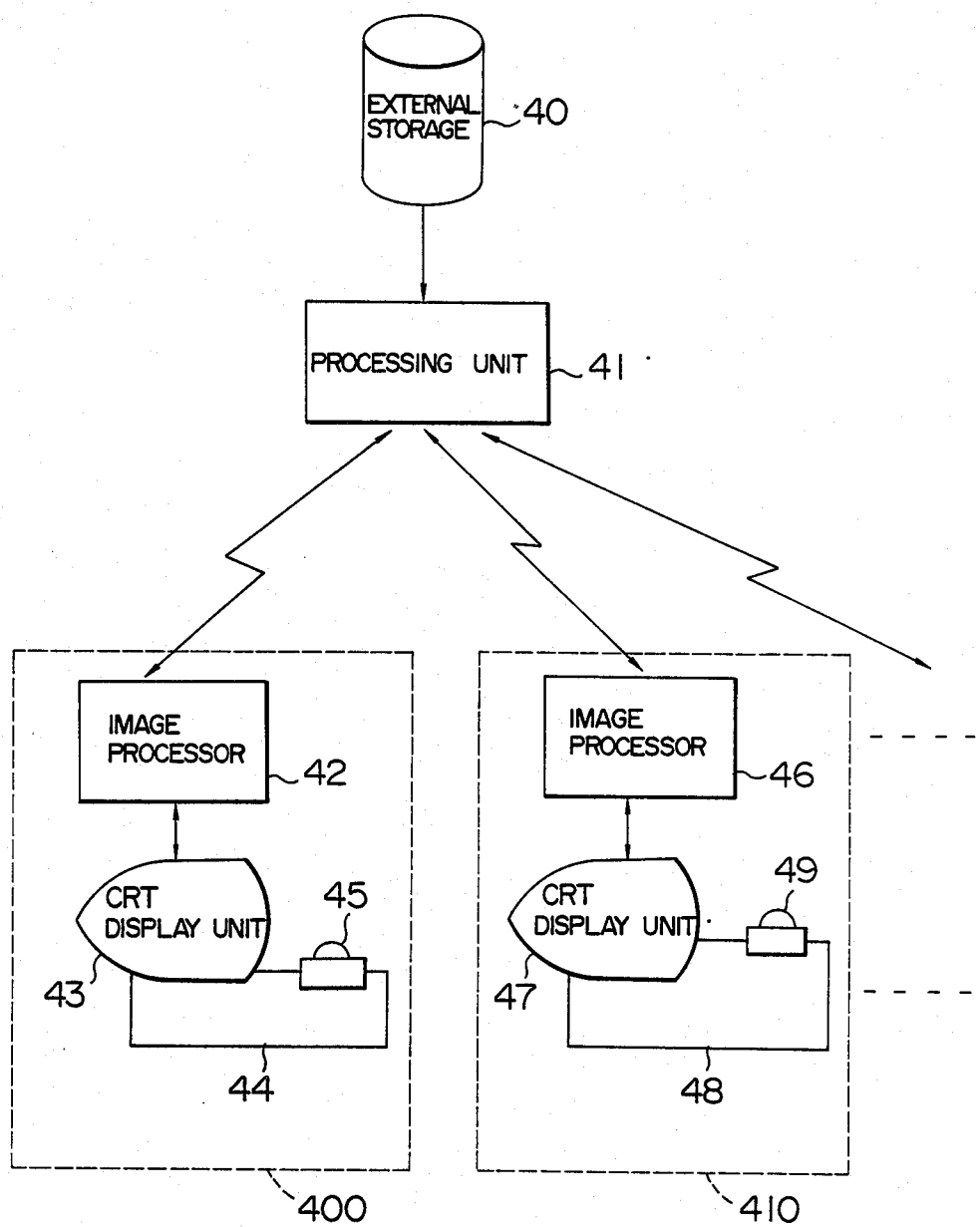

Teachings of the present invention are applicable to image processing systems as shown in FIGS. 3 and 4. In FIG. 3, an image picked up is fetched by a processing unit 32 via an A/D converter 31, and displayed on a display unit 34 and at the same time stored in an external storage 33. A doctor or an examiner manipulates a keyboard 35 and a track ball 36 to interactively determine image processing parameters for a displayed image. Finally, an original (untreated) image film 38 and a processed image film 39 are prepared by a film writer 37. If an input image is a film image, the original image film 38 is not necessary.

The above application is principally concerned with the film image but an application principally concerned with CRT display may be implemented as shown in FIG. 4. In this case, an image which has already been digitized is stored in an external storage. The stored image is fetched by a processing unit 41 and transferred to image processors 42 and 46. The thus transferred image is displayed on CRT display units 43 and 47. A doctor interactively changes quality of displayed pictures by manipulating a keyboard 44 and track ball 45 or a keyboard 48 and track ball 49 and then views renewed pictures. In FIG. 4, it is assumed that image processing terminal units 400, 410 and so on are installed in an image viewing room or a consultation room and images are viewed on line.

When an original image is represented by $X_{ij}$, an unsharp image by $\bar{X}_{ij}$, a density statistic by $\sigma_{ij}$, an emphasizing coefficient dependent on $\sigma_{ij}$ by $H(\sigma_{ij})$, an emphasizing coefficient dependent on $X_{ij}$ by $\beta(X_{ij})$, a weight function dependent on an absolute value of difference $|X_{ij}-X_{i\pm k,j\pm l}|$ between the central pixel value corresponding to the regional area of an original image $X_{ij}$ and neighbouring pixel values $X_{i\pm k, j\pm l}$ by F, and a processed image by $X'_{ij}$, equation (3) is given to express $X'_{ij}$ as follows:

$$X'_{ij}=[H(\sigma_{ij})+\beta(X_{ij})](X_{ij}-\bar{X}_{ij})+\bar{X}_{ij}+f \quad (3)$$

where $$\bar{X}_{ij}=k\Sigma_l\Sigma X_{i\pm k,j\pm l}\cdot F|X_{ij}-X_{i\pm k,j\pm l}| \quad (4)$$

and f is a suitable constant.

The kind of the statistic $\sigma_{ij}$ is determined dependent on utilization and purpose of the image but for clarity of explanation, a standard deviation is given as $\sigma_{ij}$. In equation (3), $H(\sigma_{ij})$ fills the role of exphasizing a region where less changes in image occur and of suppressing another region where more changes in image occur and is therefore defined as a monotonically decreasing function. As for $\beta(X_{ij})$, it fills the role of giving emphasis on one imaging portion to another due to the fact that the density value has corresponding dependency upon imaging portions to some extent. The F function fills the role of eliminating the influence of the edge portion to prevent generation of an artifact when an averaging processing for the formation of an unsharp image proceeds. Accordingly, the F function is herein defined as a monotonically decreasing function of the difference $|X_{ij}-X_{i\pm k,j\pm l}|$.

Figure 5:
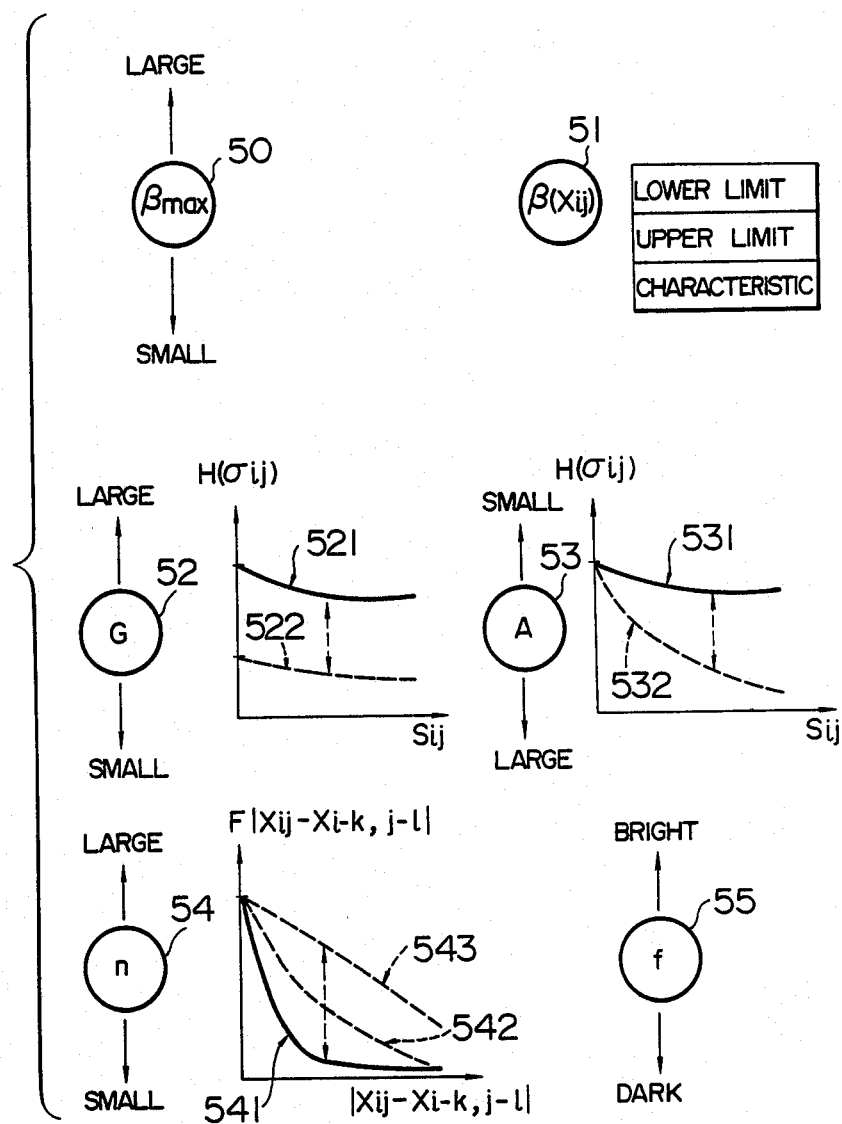
FIG. 5 shows an example of designation of parameters.

For the aforementioned processing, the parameters are designated as will be explained below with reference to FIG. 5. Firstly, a monotonically decreasing function of $H(\sigma_{ij})$ is exemplified as, $$H(\sigma_{ij})=G\cdot S/(G\sigma_{ij}+S), \ S=\bar{\sigma}/A$$

where G, S and A are suitable constants and $\sigma$ is a standard deviation of the entire image. The constant G, as designated by a block 52, represents a gain (degree of emphasizing) so that $H(\sigma_{ij})$ varies dependent on or with a parameter of the magnitude of G between curves 521 and 522. The constant A, as designated by a block 53, represents a degree of attenuation of $H(\sigma_{ij})$ and the $H(\sigma_{ij})$ varies dependent on the magnitude of A between curves 531 and 532. Particularly, curve 531 indicates that the emphasizing coefficient $H(\sigma_{ij})$ slightly changes with $\sigma_{ij}$ or values of standard deviation while curve 532 indicates that the $H(\sigma_{ij})$ rapidly attenuates as the value of $\sigma_{ij}$ increases. The F function is exemplified as a monotonically decreasing function which is, $$F(|X_{ij}-X_{i\pm k,j\pm l}|)=\left(\frac{1}{1+|X_{ij}-X_{i\pm k,j\pm l}|}\right)^{1/n}$$

and varies dependent on the magnitude of n, as designated by a block 54, to trace curves 541 to 543. Particularly, curve 543 indicates that the F function slightly attenuates as the difference increases while curve 541 indicates that the F function rapidly attenuates as the difference increases. A maximum value of the emphasizing coefficient $\beta$max, as designated by a block 50, the emphasizing coefficient $\beta(X_{ij})$ as designated by a block 51 and the brightness f as designated by a block 55 are set in a similar manner to those of FIG. 2. The aforementioned parameters are designated using, for example, the keyboard and track ball as shown in FIG. 3 or 4 so as to first input a key input representative of the kind of a parameter and thereafter effect a real-time change in a track ball input representative of the value of the parameter.

Figure 6:
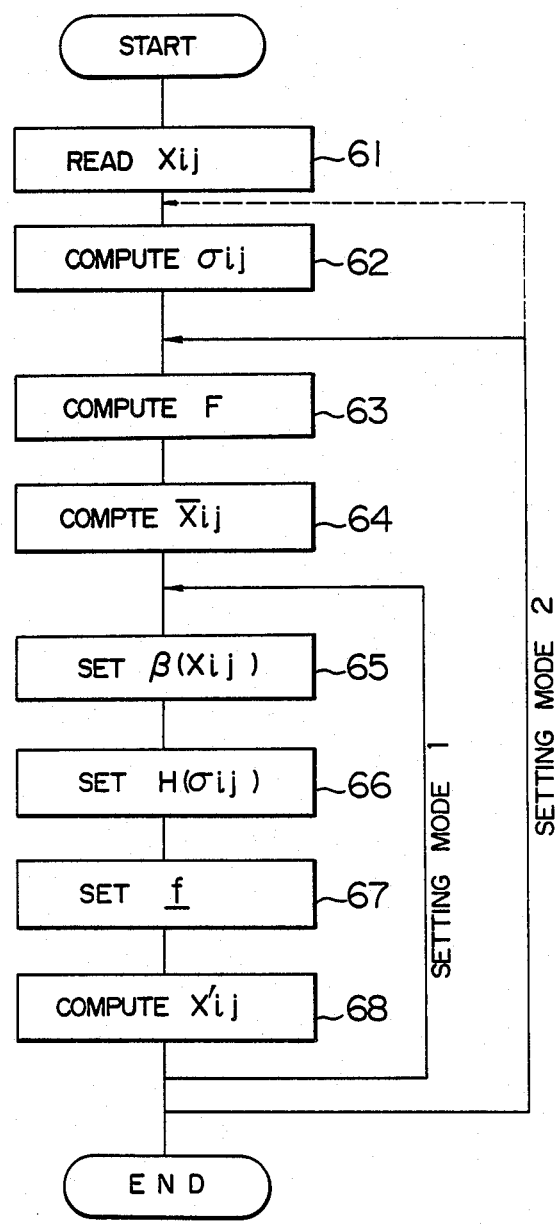
FIG. 6 is a flow chart showing an image processing procedure according to the invention.
Figure 7:
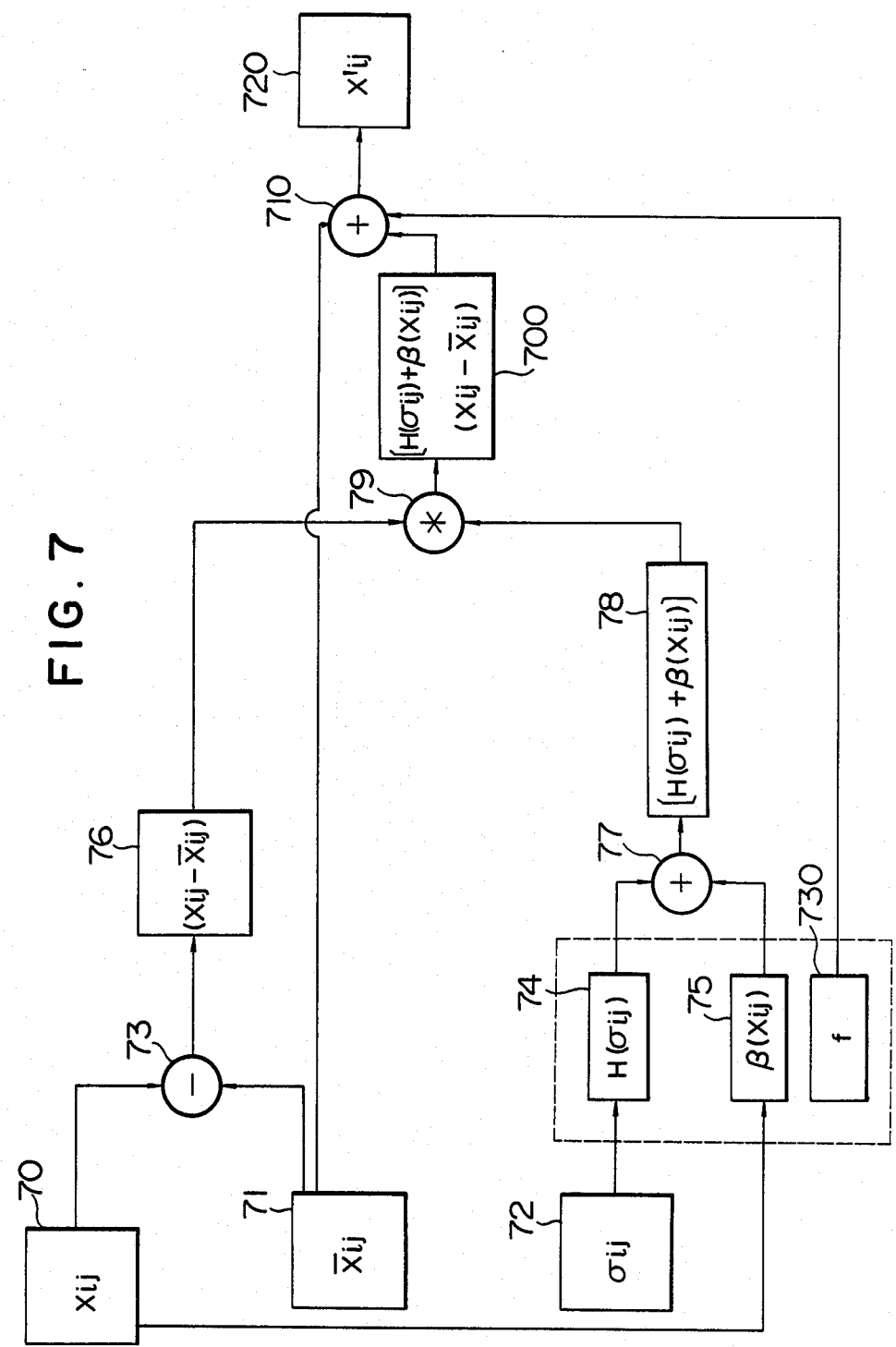
FIGS. 7 and 8 are block diagrams for explaining the contents of real-time processings.

Referring now to FIG. 6, the entire processing flow will be described.

Step 61: An original image $X_{ij}$ to be processed is inputted to a storage.

Step 62: A local standard deviation $\sigma_{ij}$ of the image to be processed is computed and stored in the storage.

Step 63: A weight coefficient F for averaging is computed.

Step 64: An unsharp image $\bar{X}_{ij}$ is prepared and stored in the storage.

Step 65: An emphasizing coefficient $\beta(X_{ij})$ dependent on a density value is set.

Step 66: An emphasizing coefficient $H(\sigma_{ij})$ dependent on the standard deviation is set.

Step 67: Brightness f is set.

Step 68: A processed image $X'_{ij}$ is computed.

When setting of the $\beta(X_{ij})$, $H(\sigma_{ij})$ or f is desired to be changed after completion of the step 68, the procedure takes a branch termed a setting mode 1 to return to the step 65. When the unsharp image $\bar{X}_{ij}$ is desired to be reformed, the procedure takes a branch termed a setting mode 2 to return to the step 63. Further, when the statistic $\sigma_{ij}$ is desired to be changed, the setting mode 2 extends to return to the step 62.

The setting modes 1 and 2 will now be detailed. In first explaining the setting mode 1 with reference to FIG. 7, it is assumed that values of the original image $X_{ij}$, unsharp image $\bar{X}_{ij}$ and standard deviation $\sigma_{ij}$ are given. Specifically, for example, default values such as G=10, S=$\bar{\sigma}$ and A=1 are given in connection with the $H(\sigma_{ij})$, and for the $\beta(X_{ij})$ a default value is expressed as $\beta(X_{ij})=10X_{ij}/g$max, where gmax is a maximum value of density.

(1) Computation of $\beta(X_{ij})$ and $H(\sigma_{ij})$

As described previously, a parameter image as designated at 75 is obtained for the $\beta(X_{ij})$ from the original image $X_{ij}$ as designated at 70 by using the look-up table for conversion. A parameter image as designated at 74 is simiarly obtained for the $H(\sigma_{ij})$ from the standard deviation $\sigma_{ij}$ as designated at 72. The parameter images 74 and 75 are then added together at an adder 77 to obtain a parameter image 78.

(2) Formation of the intended image $X'_{ij}$

Computation is carried out using the original image 70, unsharp image 71 and parameter image 78 obtained in computation (1) as above. More particularly, the unsharp image 71 is subtracted from the original image 70 at a subtractor 73 to obtain a parameter image 76 which in turn is multiplied with the parameter image 78 at a multiplier 79 to produce a parameter image 700. Finally, the parameter image 700, unsharp image 71 and brightness f designated at 730 are added together at an adder 710 to produce an intended image 720.

Since image conversion is effected thrice in the computation process of (1) and consecutive operations are effected through a single pipe-line processing in the formation process of (2), the total processing time measures about 30 mS×4≈120 mS with an image processor having a cycle time 120 nS for 512×512 pixel images, ensuring a real-time processing.

Figure 8:
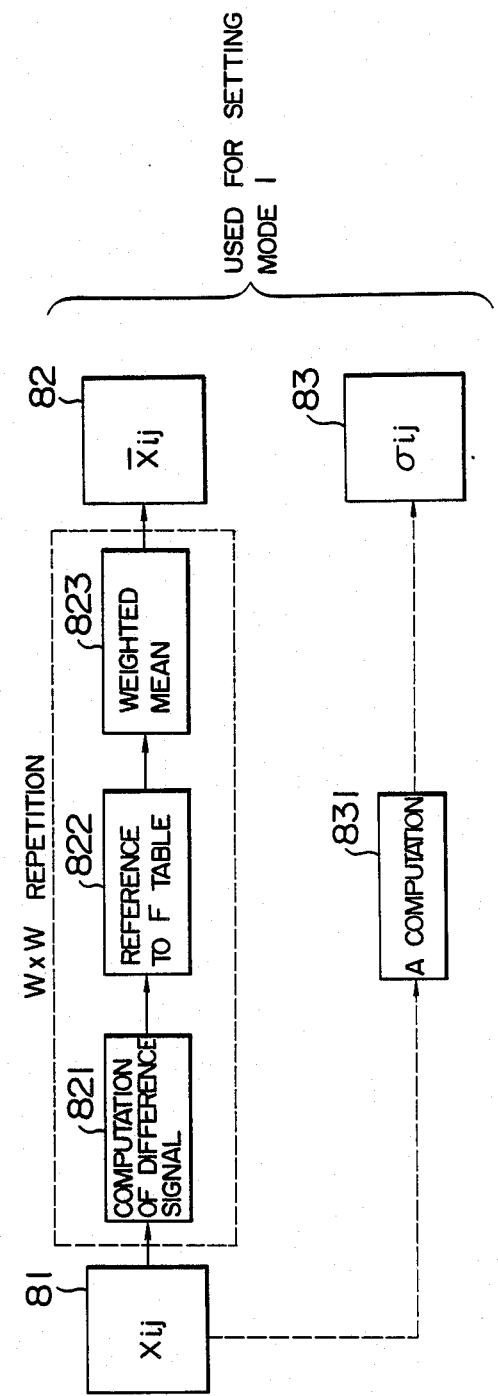

The setting mode 2 will now be described with reference to FIG. 8. The setting mode 2 is a mode for preparing from an original image as designated at 81 an unsharp image as designated at 82 and a statistic image (a standard deviation image herein) as designated at 83 which are used in the setting mode 1. The unsharp image 82 is first prepared in accordance with equation (4) through blocks 821 to 823 in which the processing is repeated W×W times where W represents the size of window. For preparation of the statistic image 83, in this example, a standard deviation $\sigma$ is computed in a block 831. The amount of arithmetic operations for the above processing is so large that a real-time processing for this purpose is impossible with an ordinary image processor. But in circumstances of general utilization, both the unsharp and statistic images once prepared may almost be intact, causing no serious problems.

In the example of FIG. 3, the optimum parameters obtained through the interactive processing are stored as attributive information (names of patients, names of disease or the like) of the original image data into the external storage 33 through the processing unit 32. By reading the attributive information and the original image data out of the external storage 33 and using them as default values, the interactive processing time can be decreased to shorten the time required for image viewing.

Figure 9:
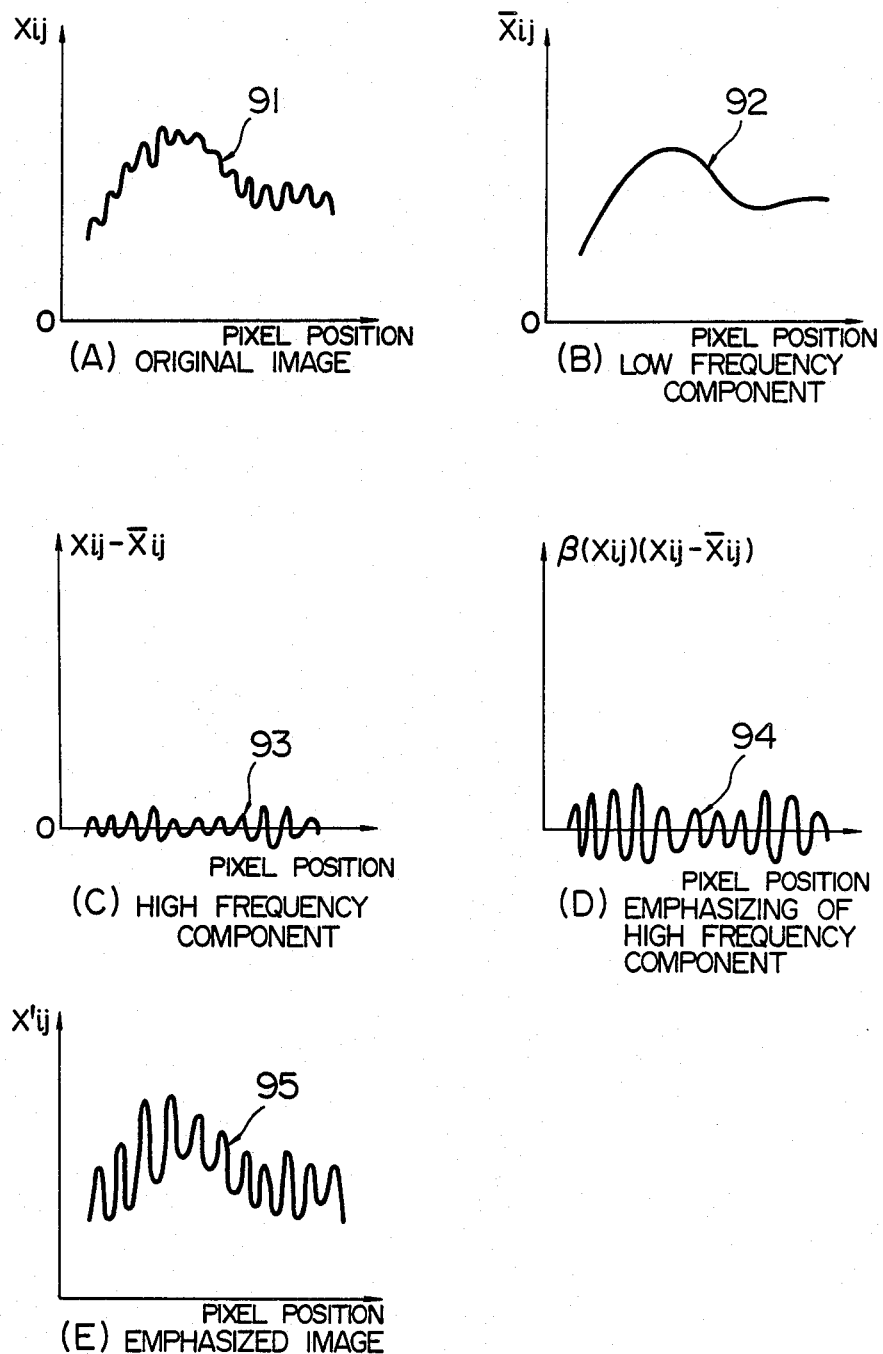
FIGS. 9(A) through (E) graphically illustrate the contents of unsharp masking processings.

Referring now to FIGS. 9 to 19, examples of the image emphasizing processing will be described. FIG. 9 shows the contents of unsharp masking processing.

Figure 10:
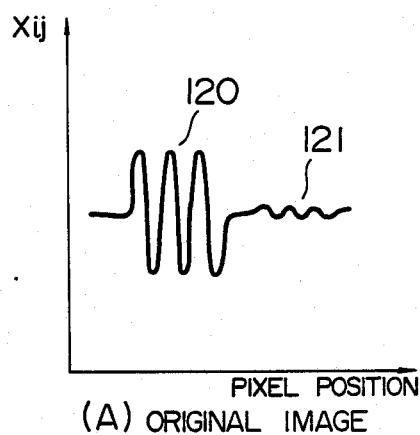
FIGS. 10(A) and (B) graphically show an example of excessive emphasis.
Figure 10:
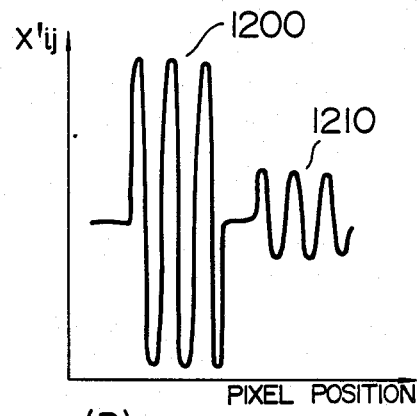
Figure 11:
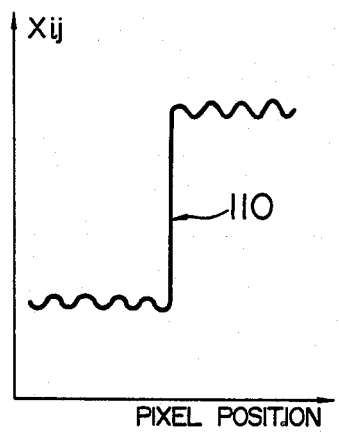
FIGS. 11(A) through (D) graphically show an artifact generation process.
Figure 11:
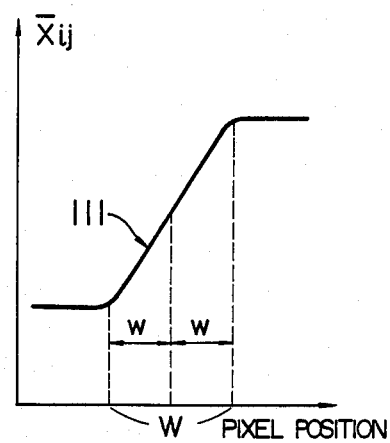
Figure 11:
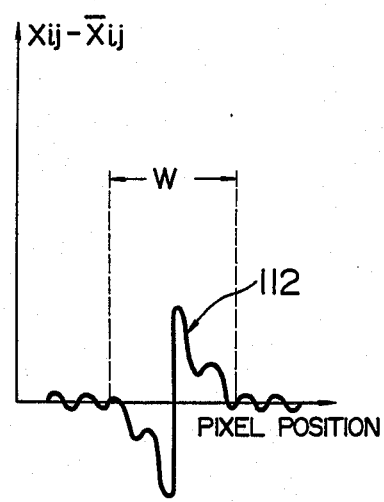
Figure 11:
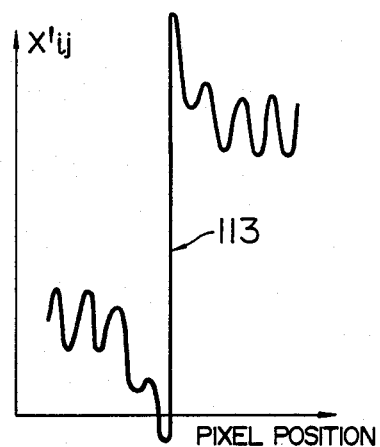
Figure 12:
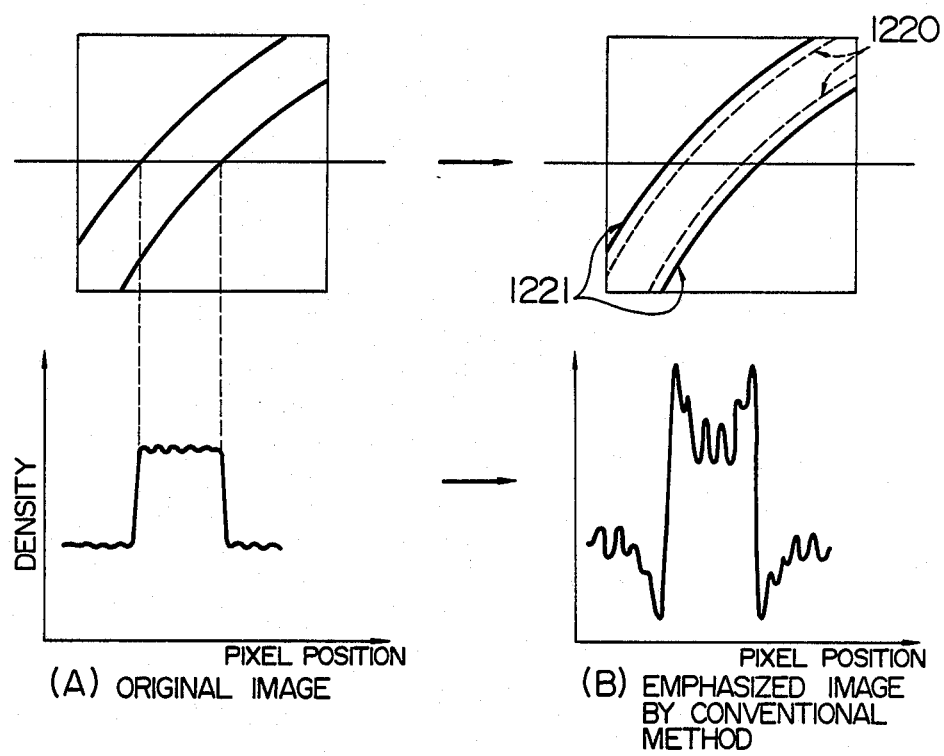
FIGS. 12(A) and (B) graphically show an example of artifact.

For simplicity of explanation, in FIG. 9, attention is drawn to a specified line within the entire image and a number of pixels arranged linearly on the specified line are considered. In FIG. 9, the ordinate represents the density value and the abscissa represents the pixel position. When an original image 91 is expressed as $X_{ij}$ (consisting of a number of original pixel images), its mean image $\overline{X}_{ij}$ provides a low frequency component 92. Consequently, a difference $X_{ij}-\overline{X}_{ij}$ is derived as a high frequency component 93. The high frequency component 93 is multiplied by an emphasizing coefficient pursuant to $\beta(X_{ij})$ to make emphasis and a resulting image is finally added with $X_{ij}$, i.e., original image 91 to provide an emphasized image 95 which is emphasized in fine structure. Especially, in order to emphasize fine changes, the value of the emphasizing coefficient $\beta(X_{ij})$ must be set to be large. However, in this case, a portion 120 of the original image which contains sufficiently distinctive changes is excessively emphasized as shown in FIG. 10 to produce an excessively emphasized portion 1200 which rather degrades visualization. Further, as shown in FIG. 11, when an edge portion 110 at which the density changes abruptly is averaged using a window having one side consisting of W pixels, a mean value for the edge portion changes at a smoothed inclination 111, thereby causing a high frequency component 112 to be distorted over the window of W pixels. This distortion is emphasized and added to the original image to create an artifact portion 113. As a result, bright and dark stripes 1220 and 1221 are generated along edge portions, as shown in FIG. 12.

Figure 13:
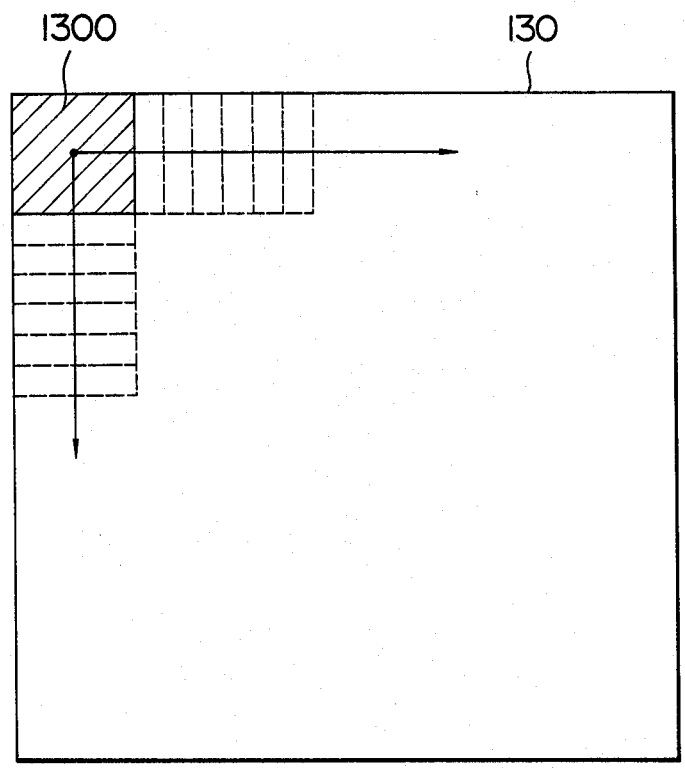
FIG. 13 is a diagrammatic representation for explaining setting of a local region (window)

To cope with these problems, according to an embodiment of the invention, the entire image, designated at 130 in FIG. 13, is divided into a number of regional images 1300, and desired characteristic values are extracted from each regional image to set the most optimum processing parameters for each regional image. More specifically, for example, a flat regional image 121 in FIG. 10 is more emphasized using a standard deviation therefor and a difference between a central pixel image and neighbouring pixel images obtained when forming an unsharp image $\overline{X}_{ij}$ is used, so as to eliminate the influence of the artifact portion 1220 or 1221.

Examples of the image emphasizing processing according to the invention will further be described with reference to FIGS. 14 to 17. When an original image is represented by $X_{ij}$, an unsharp image by $\overline{X}_{ij}$, an emphasizing coefficient dependent on a standard deviation by $H(\sigma_{ij})$, and a processed image by $X'_{ij}$, an image emphasizing process is indicated by, $$X'_{ij}=H(\sigma_{ij})\cdot(X_{ij}-\overline{X}_{ij})+e\overline{X}_{ij}+f \qquad (5)$$

where $$\overline{X}_{ij}=\Sigma_k\Sigma_l X_{i\pm k, j\pm l}\cdot F(X_{ij}-X_{i\pm k, j\pm l})$$

and l and f are suitable constants.

Figure 14:
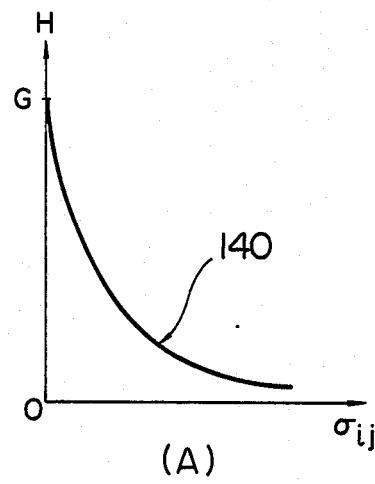
FIGS. 14(A) through (C) graphically illustrate emphasizing coefficients.
Figure 14:
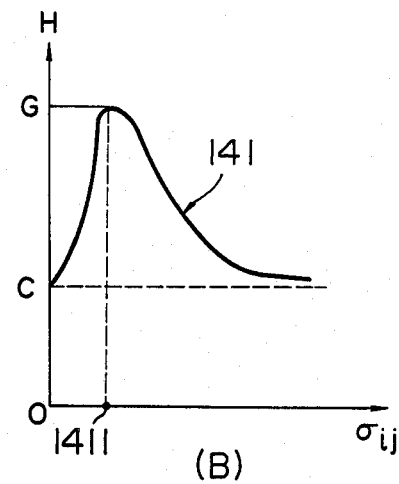
Figure 14:
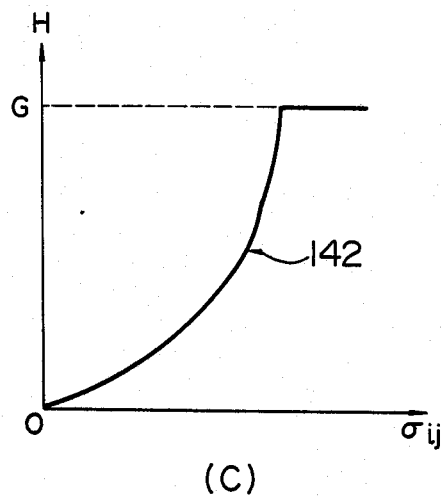
Figure 15:
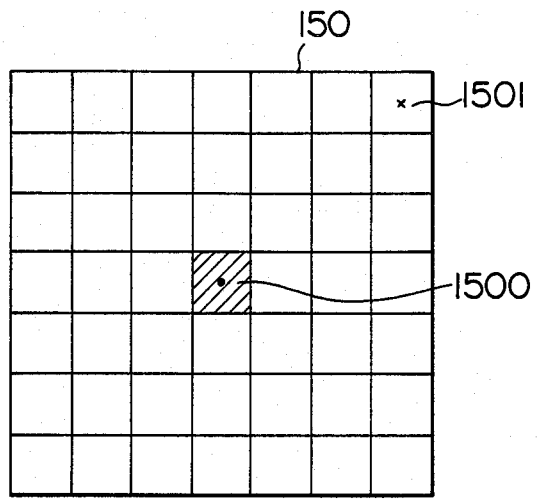
FIGS. 15(A) and (B) diagrammatically illustrate a window for formation of an unsharp image and a weight function according to the invention.
Figure 15:
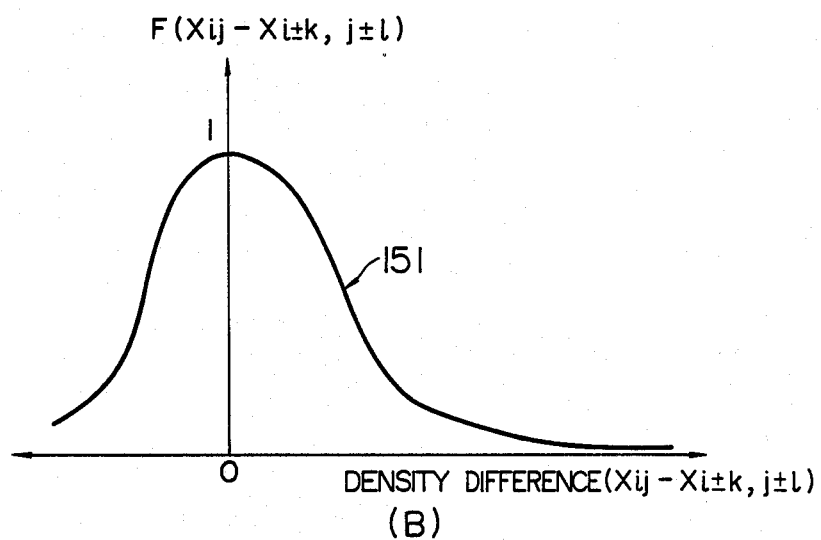
Figure 16:
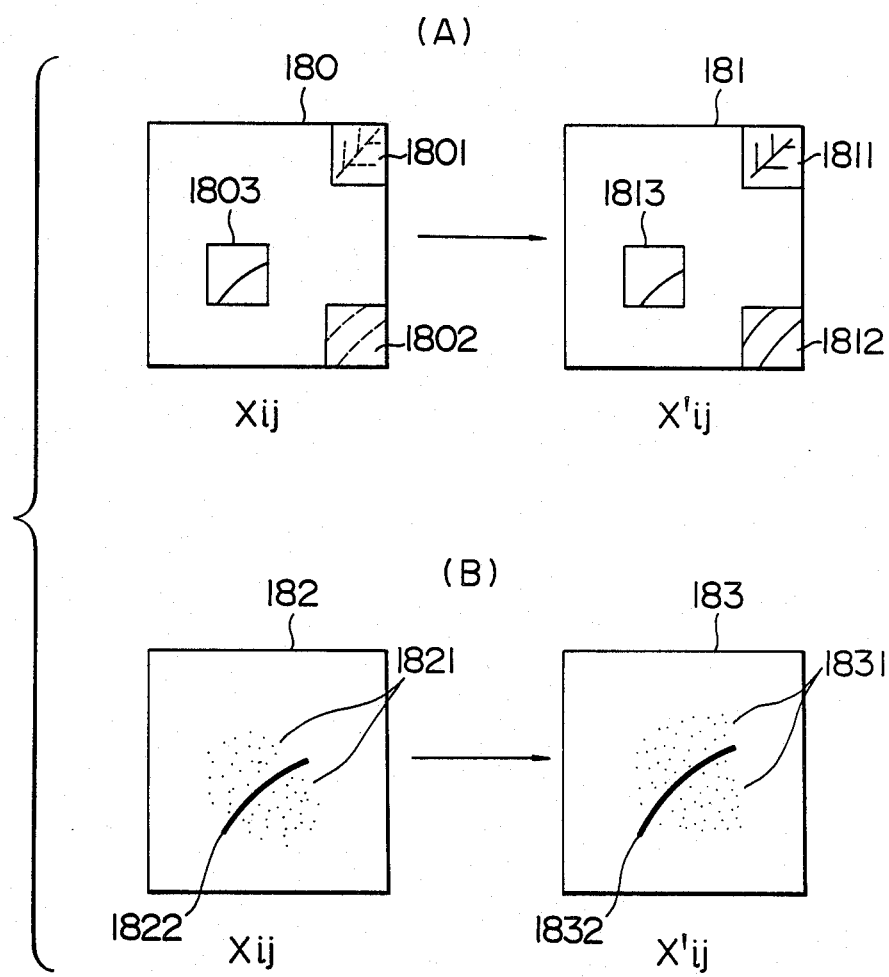
FIGS. 16A and 16B diagrammatically show an example of an emphasized image according to the invention.

Functions $H(\sigma_{ij})$ and $F(X_{ij}-X_{i\pm k, j\pm k})$ in equation (15) will be specified by referring to FIGS. 14 and 15, respectively.

The function $H(\sigma_{ij})$ is generally defined by a monotonically decreasing function of $\sigma_{ij}$, as represented by a curve 140 shown at section (A) in FIG. 14, which emphasizes a flat portion having a small standard deviation. But to avoid excessive emphasis, the maximum value of $H(\sigma_{ij})$ is limited to a predetermined level. The $H(\sigma_{ij})$ is then exemplified as, $$H(\sigma_{ij})=G\cdot S/(G\cdot \sigma_{ij}+S)$$

where G and S are suitable constants. In another example, a region of interest is designated, and a standard deviation $\sigma_{ij}$ for this region is set to a point 1411 which corresponds to the peak of the function, thereby making more selective emphasis. As shown at section (B) in FIG. 14, the $H(\sigma_{ij})$ may be defined by a curve 141 which converges to a constant value c for $\sigma_{ij}\rightarrow\infty$ and $\sigma_{ij}\rightarrow 0$(zero). Further, although not generally applied, the $H(\sigma_{ij})$ may be defined by a function which selectively emphasizes only an edge portion, in view of the fact that $\sigma_{ij}$ reflects edge portions.

FIG. 15 shows at a curve 151 an example of the function F which determines a weight coefficient when forming the unsharp image. In order to eliminate the influence of edge portions and noises, the function F is defined by a monotonically decreasing function of an absolute value of difference between a central pixel image 1500 and a neighbouring pixel image 1501 within a window.

FIGS. 16A and 16B diagrammatically show an example of image emphasizing. In the entire image of an original image $X_{ij}$, as designated at 180, there are flat portions 1801 and 1802. In contrast to a conventional method which can not selectively emphasize only the flat portions, the $H(\sigma_{ij})$ according to the invention fulfills itself to make fine emphasis on the flat portions 1801 and 1802 and to avoid excessive emphasis on an original portion 1803 of a clearly distinctive pattern, thereby making it possible to obtain the processed entire image as designated at 181 which contains a non-emphasized portion 1813 and emphasized portions 1811 and 1812 (FIG. 16A). In the entire image as designated at 182 which contains an edge portion 1822 and a noise portion 1821, on the other hand, the function F fulfills itself to negate a large difference between the central pixel image and the neighbouring pixel images which greatly contributes to the formation of the unsharp image $\overline{X}_{ij}$, with the result that in the processed entire image $X'_{ij}$ as designated at 183, creation of an artifact at an edge portion 1832 can be decreased and emphasis on a noise portion 1831 can be reduced (FIG. 16B).

Figure 17:
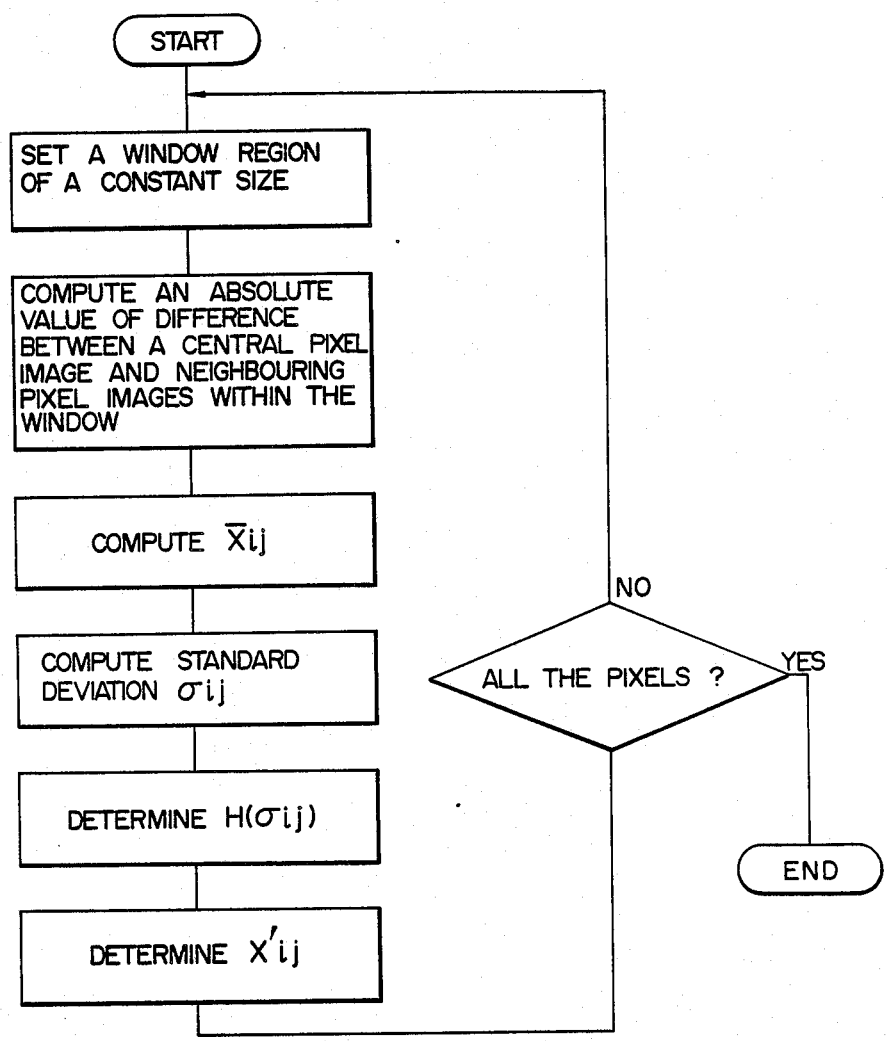
FIG. 17 is a flow chart showing an image emphasizing procedure according to the invention.

The image emphasizing processing described above proceeds in accordance with a flow chart as shown in FIG. 17.

A further embodiment directed to the formation of an unsharp image will now be described.

Figure 18:
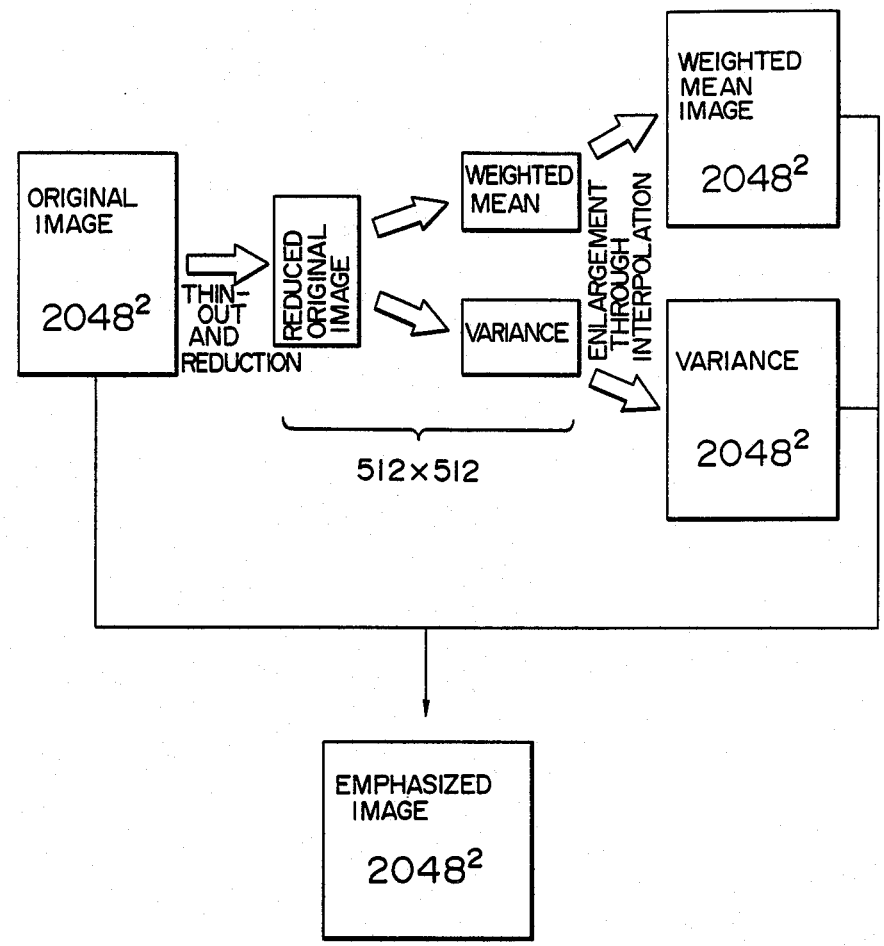
FIG. 18 is a diagram illustrative of a further embodiment of the invention directed to a processing using a reduced image.
Figure 19A:
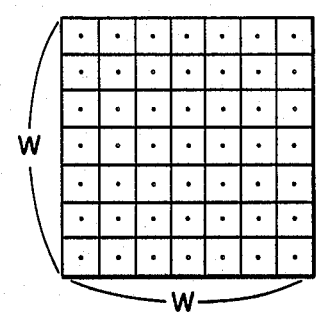
FIGS. 19(A) and (B) show a reduction in the number of computing points within a window.
Figure 19B:
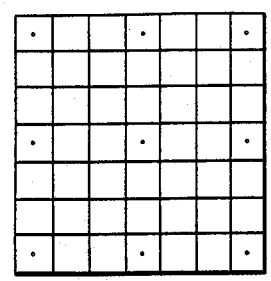

Although a digital image can be improved in resolution by increasing the number of pixels sampled from the digital image, fine sampling is rather redundant for treating a local statistic such as a weighted mean or average and a variance. Therefore, according to this embodiment, the entire image is thinned out to form a reduced image for which local statistics are computed, as best seen in FIG. 18, and omitted portions are processed by interpolation which simply needs a relatively small number of computing operations. Further, taking advantage of the fact that the local statistic can be determined deductively from samples, computing points within a local region or window as shown at (A) in FIG. 19 are thinned out as shown at (B) in FIG. 19, thereby realizing speed-up of operation.

Figure 21:
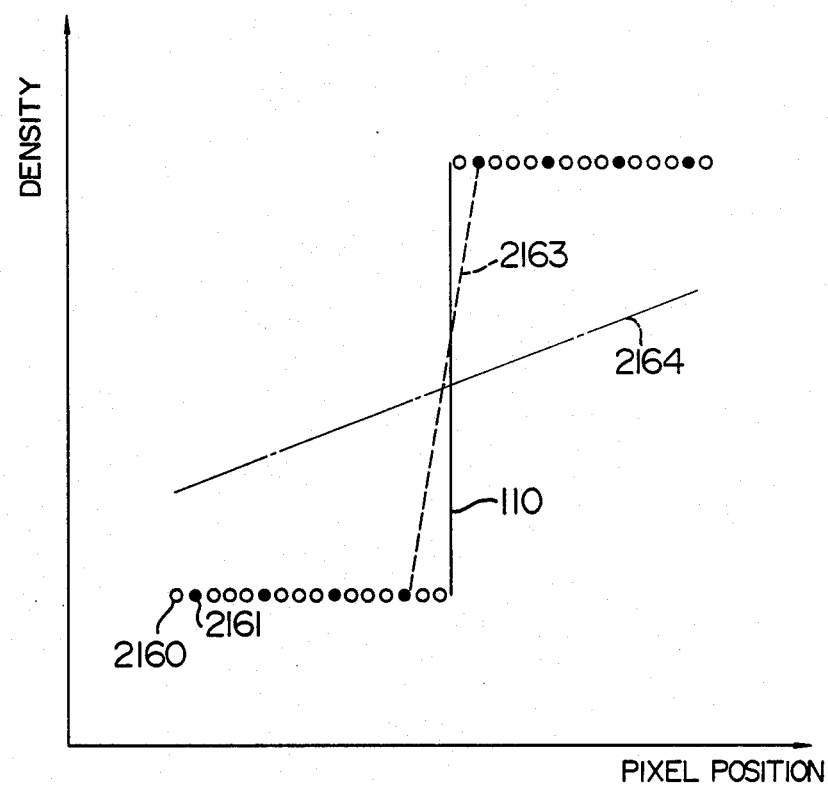
FIG. 21 graphically illustrates a difference in bluntness at an edge portion between the prior art and the present invention.

The present embodiment based on the above principle will now be described in greater detail with reference to FIGS. 20 to 21.

Figure 20A:
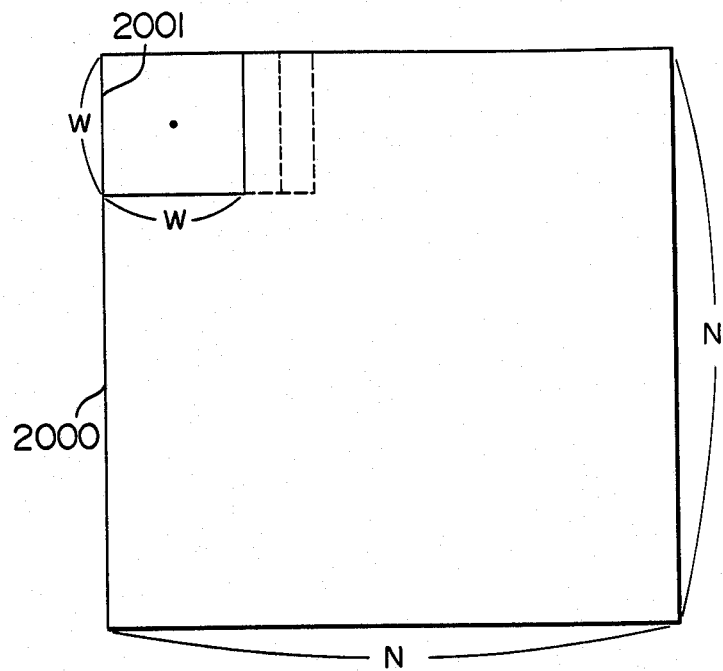
FIGS. 20(A) and (B) show a reduction in the number of computing points in accordance with a reduced image.
Figure 20B:
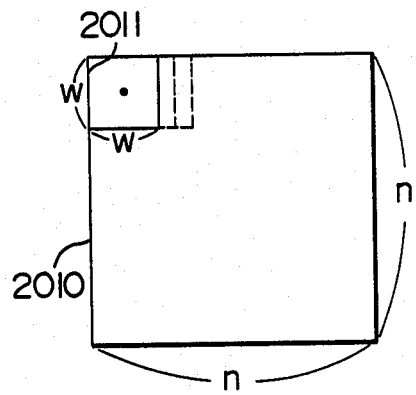

Referring to FIG. 20, when an original image 2000 is thinned out for reduction, the necessary window size is also reduced correspondingly. More specifically, where the number of pixels on one side of the original image is N, the number of pixels on one side of a window 2001 for the original image is W and similar values for a reduced image 2010 and a window 2011 therefor are n and w, respectively, $$N/n = W/w$$

is held. Given this ratio being k, the number of multiplication and addition operations within the window as well as the number of movement of the window can be reduced by $1/k^2$ for the reduced image. Further, by reducing the number of computing points through thinning-out within the window, the number of multiplication and addition operations within the window can be reduced by $1/m^2$ when the computing points within the window are thinned out by $1/m$ in the vertical and horizontal directions. Advantageously, in accordance with the present embodiment, the number of windows to be processed can also be reduced and omitted windows can be processed by an interpolation method such as a linear interpolation method. As an example, for $N=2048$ and $W=100$, the number of windows is reduced by 1/16 as compared to the prior art method by setting the thin-out ratio k to 4. Especially, when the present embodiment is applied to the edge portion 110 as illustrated at section (A) in FIG. 11 by subjecting this edge portion to local weighted averaging, $512 \times 512$ images represented by black dots 2161 as shown in FIG. 21 are computed and computing points omitted from $2048 \times 2048$ images, as represented by white dots 2160, are processed by interpolation which simply needs a smaller number of computing operations. In this instance using the $512 \times 512$ weighted mean images, the edge is slightly blunted over a four-pixel width corresponding to the thin-out ratio as indicated by dotted line 2163 but this degree of bluntness is negligible when compared to bluntness, as indicated by chained line 2164, due to the prior art simple average image which is obtained by simple averaging $2048 \times 2048$ images (pixels) within the window of window width $W = 100$. It has in fact been proven by viewing inspection that the artifact can be suppressed sufficiently.

The present embodiment is not at all problematic for the local variance which does not change like the edge but changes smoothly.

The speed-up of operation can be improved by the reduction of $1/k^2 \cdot 1/k^2 = 1/k^4$ and besides by the thinning-out of $1/m^2$ within the window. With the example described above, a processing for which an operation time would be estimated to be about $10^5$ seconds without the reduction and thin-out can in effect be executed within 100 seconds which is comparable to an operation time for a CPU of $M = 200H$, indicating that the measured value is agreeable to $1/k^4 \cdot 1/m^2 = \frac{1}{4}^4 \cdot \frac{1}{2}^2 \approx 1/1000$ grounded on $k=4$ and $m=2$ in this example.

The present embodiment can therefore reduce the number of weighted average computations and the number of local statistic computations required for adaptive filtering directed to sharpening the images, thereby advantageously improving speed-up of processing.

Figures 22A, 22B, 22C:
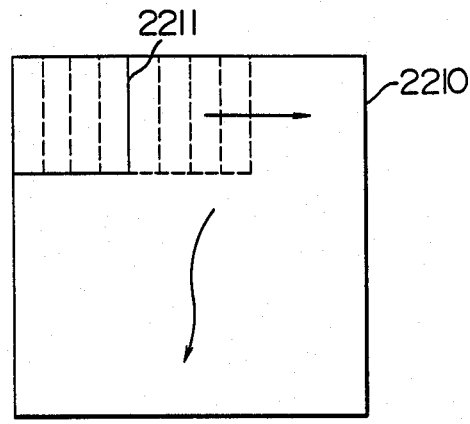
FIGS. 22(A) and (B) illustrate a way to prepare an averaged image according to the prior art method.
Figure 23A:
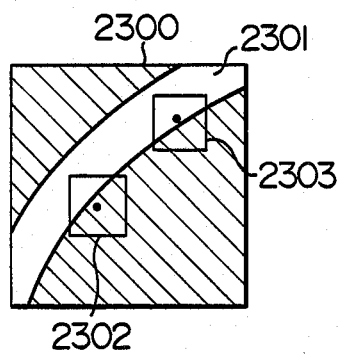
FIGS. 23(A), (B) and (C) illustrate diagrams useful to explain problems encountered in the prior art method and a way of solving the problems.
Figure 23B:
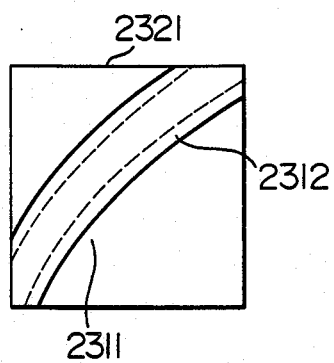
Figure 23C:
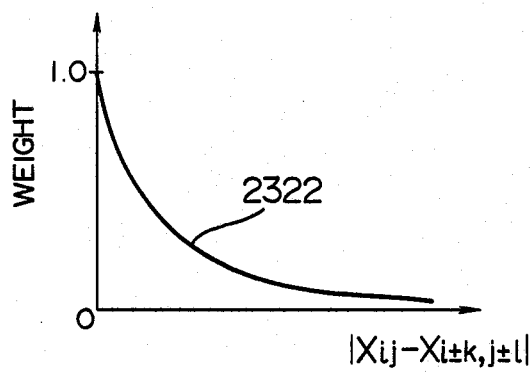

Incidentally, a countermeasure for the artifact has been described previously with reference to FIGS. 14 to 16. The problem of the artifact will again discussed shortly below. In the simple average, images $X_{i-1, j-1}$, $X_{i, j-1}, \ldots X_{i+1, j+1}$ within a window 2211 in an original image 2210 are averaged using the same weight 2212 for each image, as illustrated at sections (A) to (C) in FIG. 22. But when a high density region 2301 (corresponding to, for example, a bone) exists within an original image 2300 as shown at section (A) in FIG. 23, a simple average $\overline{X}2302$ of images within a local region (window) 2302 becomes considerably higher than a density $X2302$ of the central pixel, indicating $(X2302 - \overline{X}2302) < 0$. Contrarily, in a local region 2303, $(X2303 - \overline{X}2303) > 0$ is held. Ultimately, processed window images are expressed by $$X'2302 = X2302 + \beta \cdot (X2302 - \overline{X}2302)$$

$$X'2303 = X2303 + \beta \cdot (X2303 - \overline{X}2303),$$

causing artifacts 2311 and 2312 at the boundary between high density and low density regions in a processed image 2321 as shown at section (B) in FIG. 23. To avoid the occurrence of the artifact, a weight function 2322 as graphically shown at (C) in FIG. 23 (equivalent to the curve 140 at (A) in FIG. 14 used in the adaptive filtering set forth so far) is used to perform weighted average in accordance with an absolute difference in density between the central pixel and the neighbouring pixel. But the number of computing operations increases as a square of the window size W, posing a bottleneck in speed-up of operation.

Accordingly, in accordance with the teachings of the FIG. 18 embodiment, pixels within a window are thinned out suitably according to a window size during weighted averaging, in place of performing weighted average computations for all the pixels within the window. Especially where the image size to be processed is large, the window size is large correspondingly and the weighted averaging of pixels within the window can be represented by an average of the thinned-out pixels. Further, all of the windows are not subjected to weighted average by the same weight function but various weight functions are used for the windows in accordance with characteristics of the local regions, so that some of images can be divided into windows the majority of which have pixels that are averaged through simple average computation.

Figure 25:
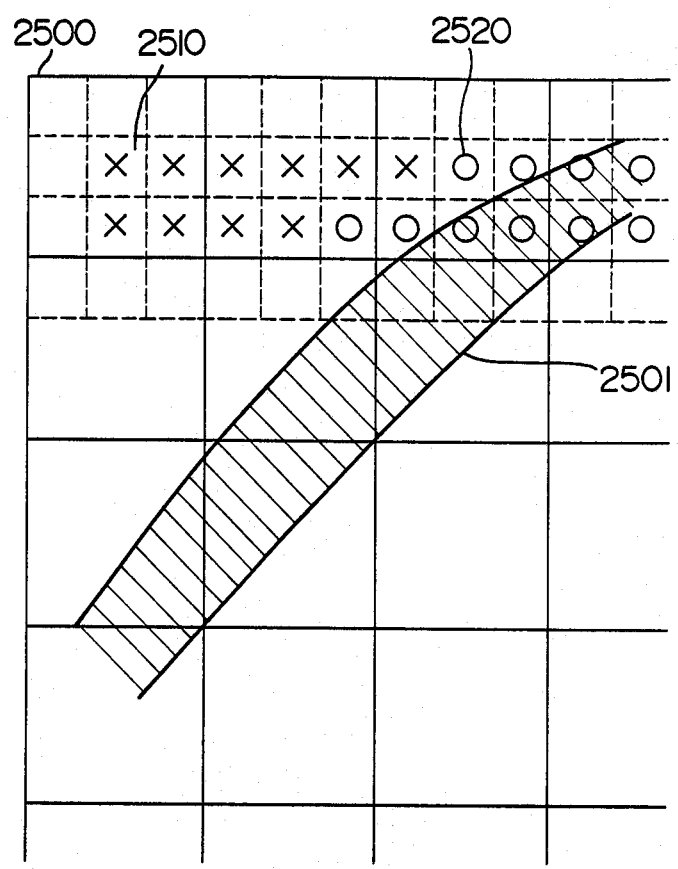
FIG. 25 is a diagram illustrating selection of either simple average computation or weighted average computation.
Figure 26A:
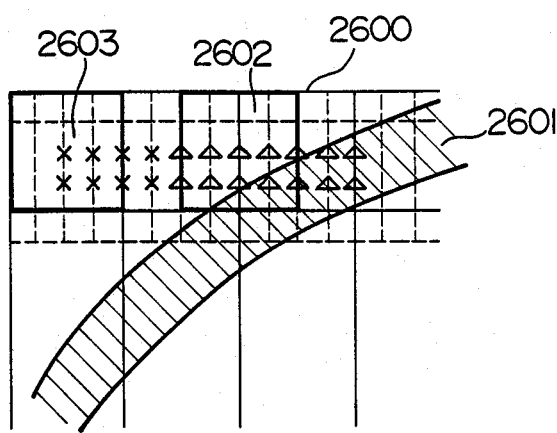
FIGS. 26(A) and (B) illustrate a way of selecting a weight function based on a standard deviation $\sigma$.
Figure 26B:
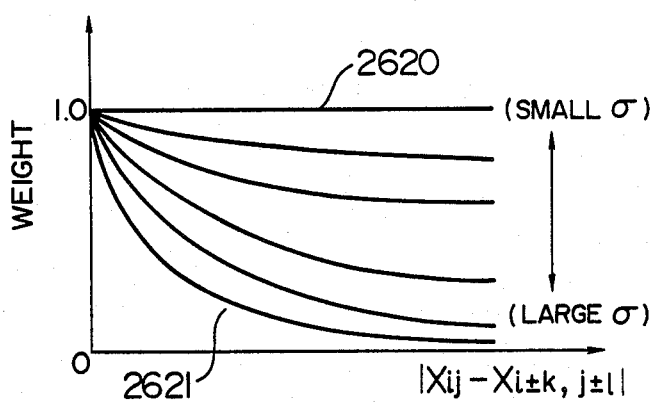

This will be described specifically with reference to FIGS. 24 to 26.

Figure 24:
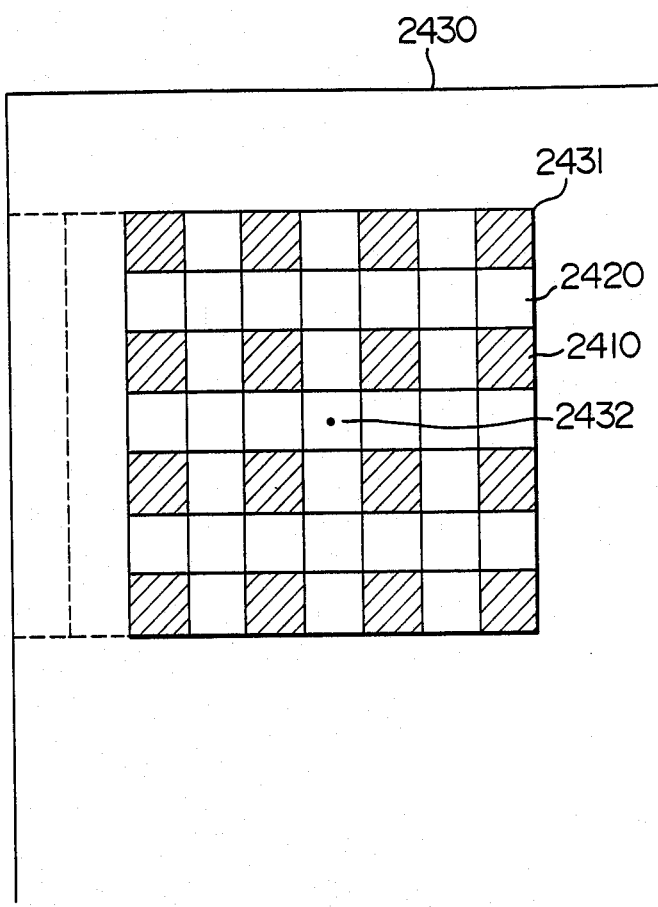
FIG. 24 is a diagram showing a reduction in the number of weighted means computation points.

Referring to FIG. 24, thin-out in weighted average computation will be explained. In an image 2430, a window 2431 is set. To weight average a central pixel 2432, only hatched pixels 2410 are computed with plain pixels 2420 being aside from the computation. In this example wherein a window size W equals 7 and the number of pixels is $7^2=49$, $4^2=16$ pixels are in effect computed, reducing the number of computing operations by ⅓. Practically, since the radiographic image has about 2048×2048 pixels in all and the window size measures about $80^2$ (6400) or $100^2$ (10000), the number of computing operations can be reduced, when the window is thinned out by ⅛ or 1/10 in the vertical and horizontal directions, such that 6400 is reduced to 6400/64=100 or 10000 is reduced to 10000/100=100, improving the speed-up extensively. To examine error from the total pixel computation, images computed for a number of windows of the window size W=$80^2$ under the condition of the thin-out ratio of ⅛ are compared with images obtained through the total pixel computation and as a result, a difference is obtained which is of only a 0.44 level (about 1%) in terms of RMS value. It has in fact been proven by viewing inspection that the difference is negligible.

The weight function is chosen as will be described below with reference to FIGS. 25 and 26. Referring to FIG. 25, an image 2500 is divided into 3×3 windows having central pixels 2510, 2520—and a high density region corresponding to, for example, a bone is represented by reference numeral 2501. The weighted averaging is with the aim of eliminating the influence of the region 2501 which exhibits a large density difference within a window. Accordingly, it is satisfactory that the window 2510 free from the influence be subjected to a simple average processing and that only the window 2520 sensitive to the influence be subjected to a weighted average processing. Thus, in FIG. 25, pixels denoted by "X" symbol are simple averaged and pixels denoted by "O" symbol are weight averaged.

To implement the choice algorithm, there needs a criterion for detection of the difference between simple average $\overline{X}$ and weighted average $\overline{X}'$. Experimentally, the difference $|\overline{X}'-\overline{X}|$ has been proven to have a high correlation to a standard deviation within the window and one of the computing modes, simple average or weighted average, may be selected by using the standard deviation $\sigma$ and setting a threshold to the standard deviation $\sigma$ within the window. Further, as shown at (B) in FIG. 26, the weight function may be graded into functions 2620 to 2621 and one of the functions may be chosen in accordance with a value of $\sigma$. In a window 2600 shown at (A) in FIG. 26, a region 2601 is a high density region, a window region 2602 has pixels denoted by "Δ" symbol which are subject to a choice of weight function in accordance with within the region, and a window region 2603 has pixels denoted by "X" symbol which are subject to the weight function 2620 equivalent to simple average.

In this manner, the number of pixels subject to weighted averaging and the number of window regions subject to weighted averaging can be reduced to thereby realize speed-up of processings.

When the emphasizing coefficient is set to be constant, the image emphasis processing can be expressed as follows:

$$X'_{ij}=K\cdot(X_{ij}-\overline{X}_{ij})+X_{ij} \qquad (6)$$

where $X_{ij}$ is the original image, $\overline{X}_{ij}$ is the unsharp image, K is the constant emphasizing coefficient and $X'_{ij}$ is the processed image, and the unsharp image $\overline{X}_{ij}$ is expressed using a weight function F dependent on $D_{kl}$ as follows:

$$\overline{X}_{ij} = \frac{1}{\sum_{kl} F(D_{kl})} \sum_{kl} X_{i-k,j-l} \cdot F(D_{kl})$$

where $D_{kl}=(X_{ij}-X_{i-k,j-l})$ represents the difference in density between the central pixel and the neighbouring pixels.

Figure 27A:
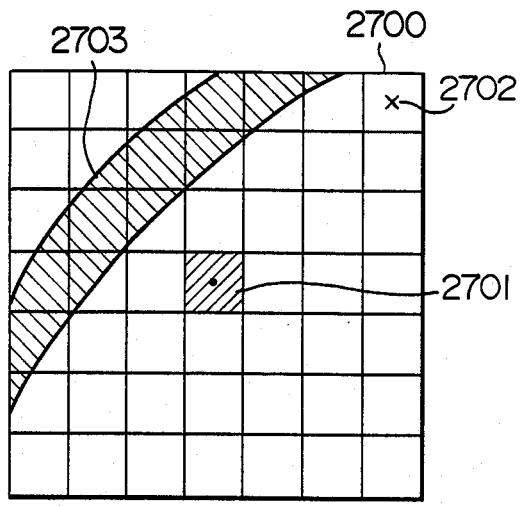
FIGS. 27(A) and (B) illustrate an exemplary way of setting a weight function according to the invention.
Figure 27B:
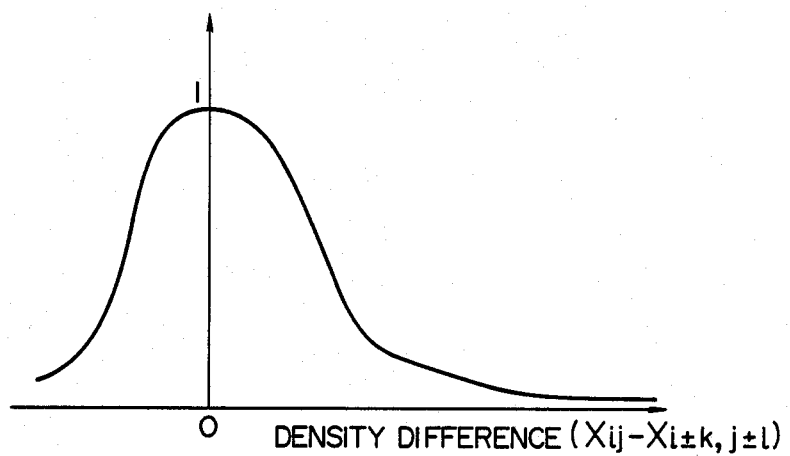
Figure 28A:
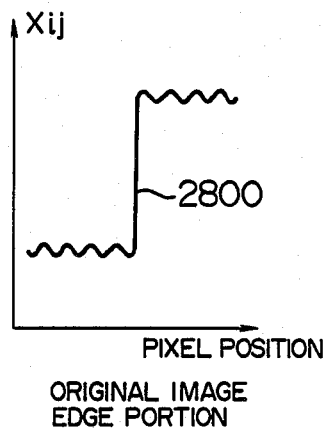
FIGS. 28(A) through (D) graphically show operational functions of the invention.
Figure 28B:
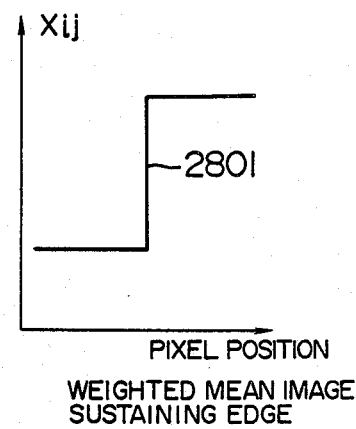
Figure 28C:
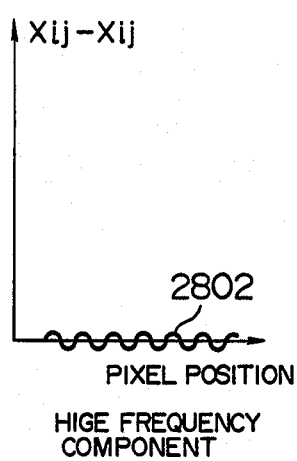
Figure 28D:
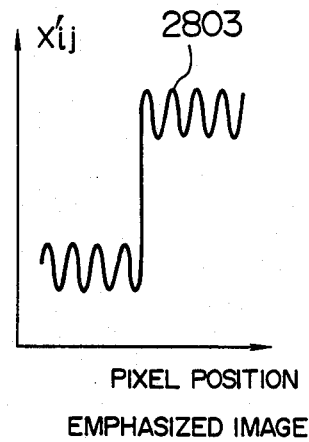

FIG. 27 illustrates, at section (B), an example of the function F. This function is similar to the function shown at (B) in FIG. 15 and in order to eliminate the influence of the edge portion, it is defined by a monotonically decreasing function of the density difference between a central pixel 2701 and a neighbouring pixel 2702 within a window 2700 as shown at (A) in FIG. 27. Thanks to the function F, a region 2703 which contains neighbouring pixels greatly differing in density from the central pixel less contributes to the formation of the unsharp image $\overline{X}_{ij}$, with the result that the unsharp image can be formed which can sustain the edge to suppress the artifact. In the course of the above processing, waveforms as shown in FIG. 28 take place. More particularly, an unsharp image 2801 sustaining an edge as illustrated at (B) in FIG. 28 is produced from an original edge image 2800 as illustrated at (A) in FIG. 28. A high frequency component 2802 resulting from subtraction of the unsharp image from the original image has a non-distorted waveform as illustrated at (C) in FIG. 28 and an emphasized image removed of the artifact as illustrated at (D) in FIG. 28 can be obtained ultimately.

Figure 29:
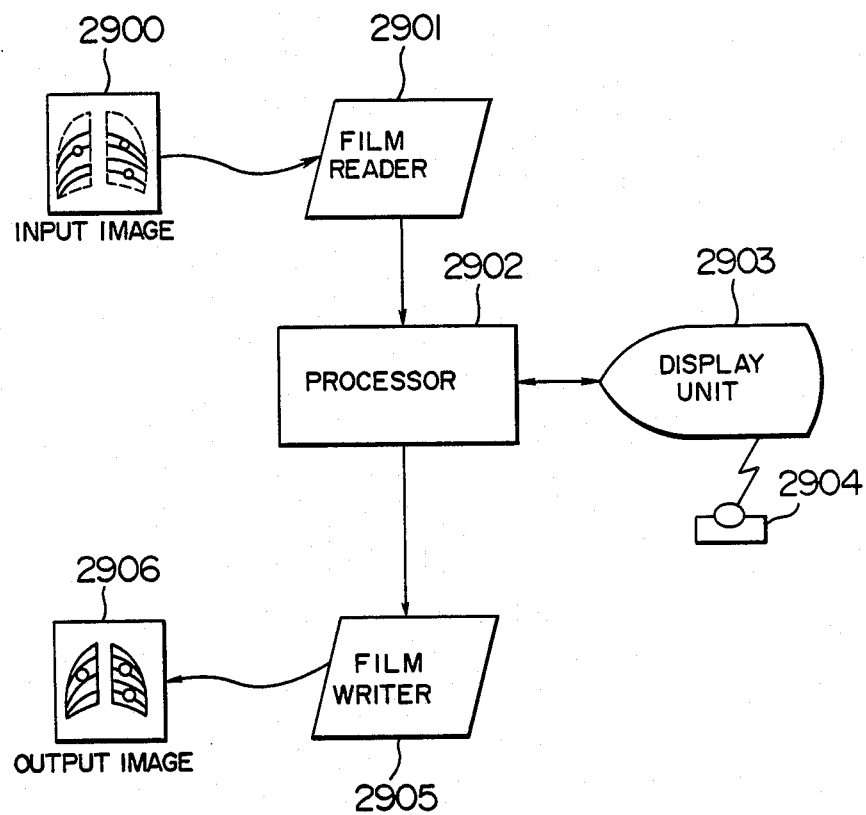
FIG. 29 is a schematic diagram showing an arrangement for an emphasizing processing.

The emphasis pursurant to equation (6) is implemented with an arrangement as schematically shown in FIG. 29.

In the radiographic image processing apparatus of FIG. 29, a photographed film input image 2900 is digitized by means of a film reader 2901 and fetched into a processor 2902. Since the processor 2902 performs the sequential processings shown in FIG. 28, an optimum image can be obtained by changing image quality by means of a pointing unit 2904 such as a track-ball while viewing images displayed on a display unit 2903 and can be printed on a film by means of a film writer 2905 to provide an emphasized image 2906.

Figure 30:
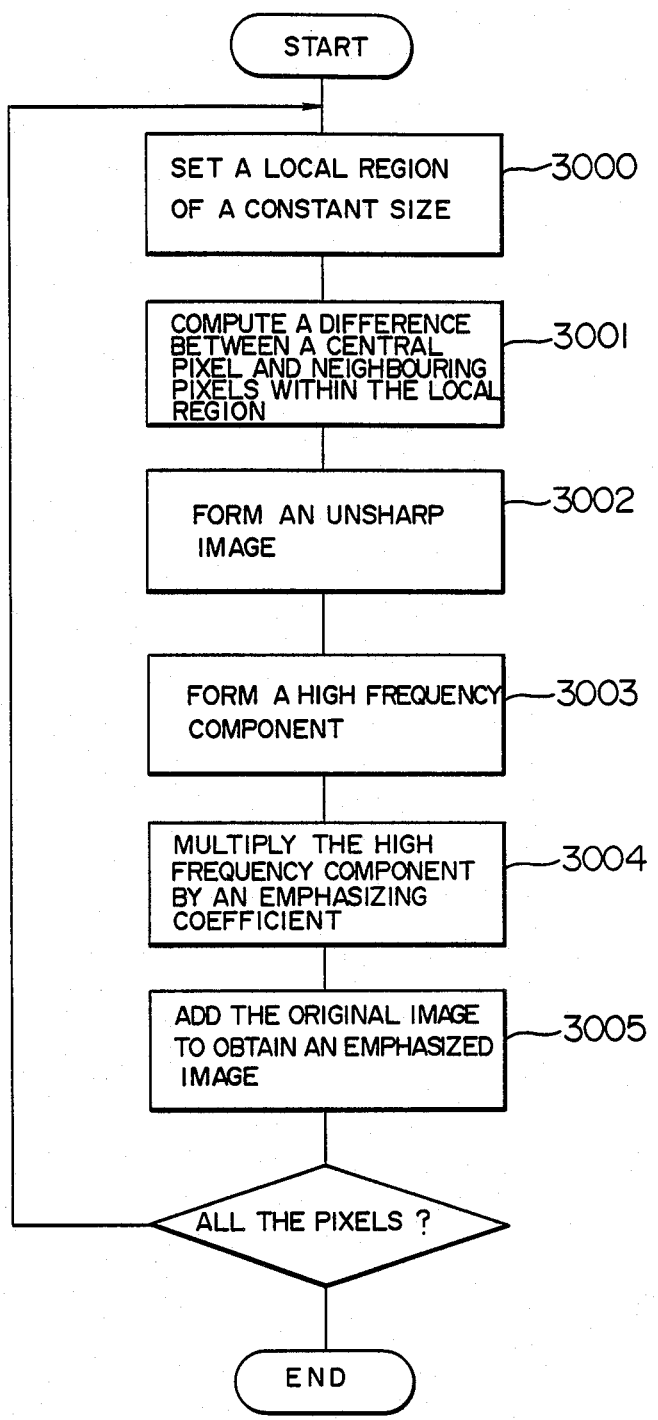
FIG. 30 is a flowchart showing an image processing procedure in the FIG. 29 arrangement.

The processor 2902 in the FIG. 29 apparatus executes the sequential processings in accordance with a flow-chart as shown in FIG. 30.

Step 3000: The image 2000 shown at (A) in FIG. 20 is divided into a number of local regions 2001 of a constant size.

Step 3001: The difference in density between the central pixel and the neighbouring pixels within the local region is computed.

Step 3002: A weight is computed on the basis of a value obtained in the step 3001 and the unsharp image $\bar{X}_{ij}$ sustaining the edge is obtained through weighted average computation.

Step 3003: The unsharp image $\bar{X}_{ij}$ is subtracted from a value of the original image $X_{ij}$ to obtain a high frequency component.

Step 3004: The high frequency component is multiplied by the constant emphasizing coefficient K.

Step 3005: A value obtained in step 3004 is added with the original image to obtain the final emphasized image.

The above processings are carried out for all the pixels.

Thus, the processing optimized for each pixel can be effected using the difference between pixels extracted from each local region of the image, thereby suppressing the artifact at the edge portion with sufficient emphasis on the fine structure, which can improve diagnostic capability conducive to physicians.

As has been described, the present invention ensures that the unsharp masking processing intended for image sharpening can be effected on a real-time basis and that various parameters for determining picture quality can be designated consecutively and interactively, so that the doctor or the examiner can prepare images optimized for diagnostic purposes to improve diagnostic capability.

Further, the optimum parameters set through the interactive processing are stored as attributive information concerning the images in the external storage and retrieved together with the images, as necessary, to shorten the time required for the interactive processing by the doctor.

Moreover, according to the invention, the filtering processing optimized for each pixel image can be effected by using a standard deviation derived from each regional image in the entire image and a difference between pixel images, thereby providing sharp and voluminous images which can improve diagnostic capability.

We claim:

1. A method of radiographic image enhancement for an unsharp masking processing, comprising the steps of dividing an image into a plurality of local images; obtaining an unsharp image by averaging neighboring pixel values at local regions of the original image; subtracting the unsharp image from the original image to produce a sharp image; and adding an original image at a desired ratio to the sharp image to create a processed image, wherein said averaging step comprises effecting a weighted mean arithmetic operation of the pixel values of the local regions based on a weight coefficient which is determined in accordance with a monotonically decreasing or increasing function with respect to a density difference between a central pixel value and neighboring pixel values.

2. A method of radiographic image enhancement according to claim 1, wherein said ratio is determined in accordance with a standard deviation of density values of the local regions, and a composite value of the standard deviation and the density value of the original image.

3. A method of radiographic image enhancement according to claim 1 wherein said ratio is set at a constant.

4. A method of radiographic image enhancement according to claim 1, further comprising a step of changing an emphasizing coefficient of said sharp image in accordance with a standard deviation of density values of the local regions or a composite value of the standard deviation and the original image density, interactively and consecutively.

5. A method of radiographic image enhancement according to claim 4, wherein said changing step includes a step for interactively designating a size of a local region used for formation of the unsharp image.

6. A method of radiographic image enhancement according to claim 4, wherein said changing step includes a step for interactively designating a level of brightness of a processed image.

7. A method of radiographic image enhancement according to claim 4, wherein said changing step includes a step for storing values of said emphasizing coefficient, a size of a local region and a level of brightness inputted interactively as picture quality parameters.

8. A method of radiographic image enhancement according to claim 7, wherein said changing step includes a step of reading said stored picture quality parameter values and automatically setting the picture quality parameters for executing emphasizing.

* * * * *